United States Patent
Isozaki et al.

(10) Patent No.: US 8,478,108 B2
(45) Date of Patent: Jul. 2, 2013

(54) APPARATUS, METHOD, AND COMPUTER PROGRAM PRODUCT FOR RECORDING CONTENT

(75) Inventors: Hiroshi Isozaki, Kanagawa (JP); Atsushi Ishihara, Kanagawa (JP); Taku Kato, Kanagawa (JP); Toru Kambayashi, Kanagawa (JP); Shinichi Matsukawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/413,479

(22) Filed: Mar. 6, 2012

(65) Prior Publication Data

US 2012/0170913 A1    Jul. 5, 2012

Related U.S. Application Data

(63) Continuation of application No. 11/813,972, filed as application No. PCT/JP2007/056127 on Mar. 16, 2007, now Pat. No. 8,145,030.

(30) Foreign Application Priority Data

Jul. 11, 2006    (JP) .................................. 2006-190720

(51) Int. Cl.
*H04N 9/80*    (2006.01)
*H04L 29/06*    (2006.01)

(52) U.S. Cl.
USPC ............................ 386/252; 386/260; 713/156

(58) Field of Classification Search
None
See application file for complete search history.

(56) References Cited

U.S. PATENT DOCUMENTS 5,982,891 A     11/1999  Ginter et al.
7,114,070 B1 *   9/2006  Willming et al. ............. 713/156
2003/0217275 A1 * 11/2003 Bentley et al. ................ 713/184

FOREIGN PATENT DOCUMENTS

EP    0809244 A2    11/1997

OTHER PUBLICATIONS

"Advanced Access Content System (AACS): Introduction and Common Cryptographic Elements", Pre-recorded Video Book, AACS, pp. ii-xii and 1-70, 2006.
"Advanced Access Content System (AACS): HD DVD and DVD Pre-Recorded Book", AACS, pp. ii-x and 11-166, 2006.
"AACS-Pre-recorded video Book", Internet Publication, Intel Corporation et al., Mar. 18, 2006, pp. 1-61, http://web.archive.org/web/20060318161711/www.aacsla.com/specification/specs091/AACS_Spec_Prerecorded_0.91.pdf>.
"AACS-Introduction and Common Cryptographic Elements", Internet Article, Intel Corporation et al., Mar. 19, 2006, pp. 1-82, http://web.archive.org/web/20060319164126/www.aacsla.com/specifications/specs091/AACS_Spec Common_0.91.pdf>.
"AACS-Recordable video book", Internet Article, Intel Corporation et al., Mar. 22, 2006, pp. 1-23 http://web.archive.org/web/20060322184826/www.aacsla.com/specifications/specs091/AACS_Spec_Recordable_0.91.pdf>.

* cited by examiner

*Primary Examiner* — Gelek W Topgyal
(74) *Attorney, Agent, or Firm* — Oblon, Spivak, McClelland, Maier & Neustadt, L.L.P.

(57) ABSTRACT

An apparatus determines whether a combination of a certificate type of a content certificate recorded on a source recording medium and a medium type of the source recording medium is a proper combination. If the combination is a proper combination, the apparatus requests a license server, which is connected to the apparatus via a network, to give approval to record content on a target recording medium. If the apparatus is a legitimate DVD recorder, the license server sends to the content recording apparatus a content certificate including on the source recording medium as the certificate type. The apparatus records the content together with the received content certificate on the target recording medium.

6 Claims, 15 Drawing Sheets

FIG.2

CONTENT CERTIFICATE

| CERTIFICATE TYPE<br>(0:DVD-ROM , 1:RECORDABLE DVD ) |
|---|
| . . . |
| CONTENT SEQUENCE NUMBER |
| CONTENT REVOCATION LIST<br>VERSION NUMBER |
| CONTENT HASH VALUE |
| SIGNATURE |

FIG.11

| CONTENT TYPE ON RECORDING SOURCE | RECORDING TARGET | ACTION | CERTIFICATE TYPE TO BE REQUESTED |
|---|---|---|---|
| CONTENT RECORDED ON DVD-ROM | DATA STORAGE UNIT | COPY | - |
| CONTENT RECORDED ON DVD-ROM | RECORDABLE DVD | COPY | COPIED CONTENT |
| COPIED CONTENT STORED IN DATA STORAGE UNIT | RECORDABLE DVD | MOVE | COPIED CONTENT |
| DOWNLOAD CONTENT STORED IN DATA STORAGE UNIT | RECORDABLE DVD | COPY | COPIED CONTENT |
| DOWNLOAD CONTENT STORED IN DATA STORAGE UNIT | RECORDABLE DVD | MOVE | DOWNLOAD CONTENT |
| DOWNLOAD CONTENT RECORDED ON RECORDABLE DVD | DATA STORAGE UNIT | COPY | - |
| DOWNLOAD CONTENT RECORDED ON RECORDABLE DVD | DATA STORAGE UNIT | MOVE | - |
| DOWNLOAD CONTENT RECORDED ON RECORDABLE DVD | RECORDABLE DVD | COPY | COPIED CONTENT |
| DOWNLOAD CONTENT RECORDED ON RECORDABLE DVD | RECORDABLE DVD | MOVE | DOWNLOAD CONTENT |

US 8,478,108 B2

APPARATUS, METHOD, AND COMPUTER PROGRAM PRODUCT FOR RECORDING CONTENT

CROSS REFERENCE TO RELATED APPLICATION

The present application is a continuation of U.S. application Ser. No. 11/813,972, filed on Jul. 13, 2007, which was the National Stage entry of International Application No. PCT/JP07/56127, filed Mar. 16, 2007, which claimed priority to Japanese Application No. 2006-190720, filed on Jul. 11, 2006. Application Ser. No. 11/813,972 is hereby incorporated by reference in its entirety.

TECHNICAL FIELD

The present invention relates to a technology for recording content such as a moving picture on a recording medium.

BACKGROUND ART

The Content Scramble System (CSS) and the Content Protection for Recordable Media (CPRM) are used to protect illegal copy of content. The CSS protects content recorded on a read-only memory (ROM) type recording medium, such as a digital versatile disc (DVD) or the like, by scrambling the content so that the content cannot be played back. On the other hand, the CPRM protects content recorded on a recordable recording medium.

However, both the CSS and the CPRM are not enough to prevent illegal copy of content recorded on a DVD. In other words, above-mentioned conventional technologies cannot sufficiently respond to an issue of copyright piracy that has been taking place frequently in recent years.

Namely, there are reports that a DVD player is illegally altered to play back DVD content and the DVD content is unscrambled and converted to plaintext content. Then, the plaintext content, which is not scrambled, can be easily copied onto other DVDs or the like. The copied DVD, so-called "pirated DVD", is illegally distributed. The pirated DVD can also be widely distributed by peer-to-peer file sharing via the Internet.

To solve the problem, Advanced Access Content System (AACS) is developed for next-generation DVD-videos such as high-definition (HD) DVDs. As disclosed in AACS Prerecorded Video Book Revision 0.90 (Chapters 2 and 3), the AACS employs a Content Certificate (CC) technology to detect whether content is illegally recorded on a recording medium even if the content is already converted to plaintext content.

In the CC technology, a hash value is generated from a portion of content to create a content certificate therein. The content certificate contains a signature that is encrypted by using a private key held by a licenser. A predetermined digital watermark (WM) is embedded in the content when the content is produced. The WM-embedded content is encrypted and recorded together with the content certificate on a recording medium. The WM is set to abort playback of the content whenever the WM is detected. On the other hand, a public key corresponding to the private key included in the content certificate is embedded in a content playback apparatus (e.g., a DVD player). When the content is to be played back, before playing back the content, the content playback apparatus checks whether the content certificate contains an appropriate signature. Moreover, during playback of the content, the content playback apparatus calculates a hash value of the content and checks whether the hash value is not altered based on comparison of the calculated hash value with the hash value contained in the content certificate. If a recording medium does not contain a content certificate, or if the content certificate included in the content does not include an appropriate signature, the content playback apparatus during playback checks whether a WM is present in the content. When a WM is detected, the content playback apparatus is set to abort playback. Thus, the DVD player can prevent playback of a pirated DVD.

Even if encrypted content is unscrambled and converted to plaintext content by an illegally-altered content playback apparatus, and the plaintext content is copied on a recording medium, a content certificate including a signature cannot be recorded on the plaintext content properly. Thus, a legitimate content playback apparatus will confirm presence of a WM in content and successfully abort playback of the content. Also, even if the plaintext content is further encrypted by an illegally-altered content playback apparatus to disguise the content as proper encrypted content, it is not possible to forge a signature because only the private key held by the licenser can be used to create the signature. Thus, if a legitimate content playback apparatus is used to play back the illegally-copied content, the legitimate content playback apparatus cannot successfully verify a content certificate, and also detects a WM in the content, whereby the legitimate content playback apparatus aborts playback of the content. A detection of a content certificate is set to be performed on video content, i.e., a ROM medium (a pre-recorded medium) only. Therefore, even if a content certificate is copied from a proper ROM medium onto a recordable recording medium, a legitimate DVD player can abort playback of illegally-copied content by detecting a WM embedded in the content despite the content contains the content certificate.

If a user is allowed to copy content upon observance of predetermined rules in the near future, the user can copy the content onto a hard disk drive (HDD) or the like so that the user enjoys playing back the content outside without physically carrying the content. Also, the user can back up the content in case a source recording medium is physically damaged.

However, the conventional CC technology covers exclusively for content recorded on a ROM medium. Thus, it is not possible to record a content certificate on a recordable recording medium in a legitimate manner. Moreover, it is not possible to detect whether content recorded on a recordable recording medium is illegally copied during playback.

DISCLOSURE OF INVENTION

According to an aspect of the present invention, an apparatus to record a content onto a target recording medium, the content being encrypted by a first cryptographic key and being recorded on a source recording medium embedded with a predetermined digital water mark, the source recording medium recording a content certificate thereon, the content certificate including a certificate type indicating a record type of the content on the source recording medium. The apparatus including a certificate verifying unit that verifies whether a combination of the certificate type of the content certificate recorded on the source recording medium and a medium type of the source recording medium is a proper combination; a key storage unit that stores therein a public key corresponding to the second cryptographic key; a requesting unit that transmits, if the certificate verifying unit verifies that the combination is a proper combination, a record-permission request to a license server to get approval to record the content on the target recording medium via an on-line network; a certificate receiving unit that receives, if the license server gives approval to record the content on the target recording medium, a content certificate that includes a certificate type indicating a record type on the target recording medium from the license server; and a recording unit that records the content together with the content certificate received from the license server on the target recording medium, wherein existence of the predetermined digital water mark is determined at the time of playback of the content when the content certificate does not exist in the target recording medium.

According to another aspect of the present invention, an apparatus to records a content onto a recordable target recording medium, the content being encrypted by a first cryptographic key and being recorded on a read-only source recording medium embedded with a predetermined digital water mark, the read-only source recording medium recording a content certificate thereon, the content certificate including a certificate type indicating a record type of the content on the source recording medium. The apparatus including a requesting unit that transmits a medium type of the source recording medium and the content certificate including the certificate type on the source recording medium to a license server via an on-line network as a record-permission request to give approval to record the content on the target recording medium; a certificate receiving unit that receives, if the license server gives approval to record the content on the target recording medium, and also if the license server verifies that a combination of the certificate type and a medium type of the source recording medium is a proper combination, a content certificate that includes a certificate type indicating a record type on the target recording medium from the license server; and a recording unit that records the content together with the content certificate received from the license server on the target recording medium, wherein existence of the predetermined digital water mark is determined at the time of playback of the content when the content certificate does not exist in the target recording medium.

According to still another aspect of the present invention, a method to record a content onto a target recording medium, the content being encrypted by a first cryptographic key and being recorded on a source recording medium being embedded with a predetermined digital watermark, the source recording medium recording a content certificate thereon, the content certificate including a certificate type indicating a record type of the content on the source recording medium. The method includes verifying whether a combination of the certificate type of the content certificate recorded on the source recording medium and a medium type of the source recording medium is a proper combination; storing a public key corresponding to the second cryptographic key in a key storage unit; transmitting, if it is verified at the verifying that the combination is a proper combination, a record-permission request to a license server to get approval to record the content on the target recording medium via an on-line network; receiving, if the license server gives approval to record the content on the target recording medium, a content certificate that includes a certificate type indicating a record type on the target recording medium from the license server; and recording the content together with the content certificate received from the license server on the target recording medium.

According to still another aspect of the present invention, a computer program product that includes a computer-readable recording medium that stores therein a plurality of commands that cause a computer to record a content onto a target recording medium, the content being encrypted by a first cryptographic key and being recorded on a source recording medium embedded with a predetermined digital watermark, the source recording medium recording a content certificate thereon, the content certificate including a certificate type indicating a record type of the content on the source recording medium. The commands cause the computer to execute verifying whether a combination of the certificate type of the content certificate recorded on the source recording medium and a medium type of the source recording medium is a proper combination; storing a public key corresponding to the second cryptographic key in a key storage unit; transmitting, if it is verified at the verifying that the combination is a proper combination, a record-permission request to a license server to get approval to record the content on the target recording medium via an on-line network; receiving, if the license server gives approval to record the content on the target recording medium, a content certificate that includes a certificate type indicating a record type on the target recording medium from the license server; and recording the content together with the content certificate received from the license server on the target recording medium, wherein existence of the predetermined digital water mark is determined at the time of playback of the content when the content certificate does not exist in the target recording medium.

BRIEF DESCRIPTION OF DRAWINGS

FIG. 2 is example of a content certificate according to the first embodiment;

FIG. 11 is a table of content types of content recorded on source DVD media, target DVD media, types of action, and certificate types to be requested;

BEST MODE(S) FOR CARRYING OUT THE INVENTION

Exemplary embodiments of the present invention are explained in detail below with reference to the accompanying drawings.

Figure 1:
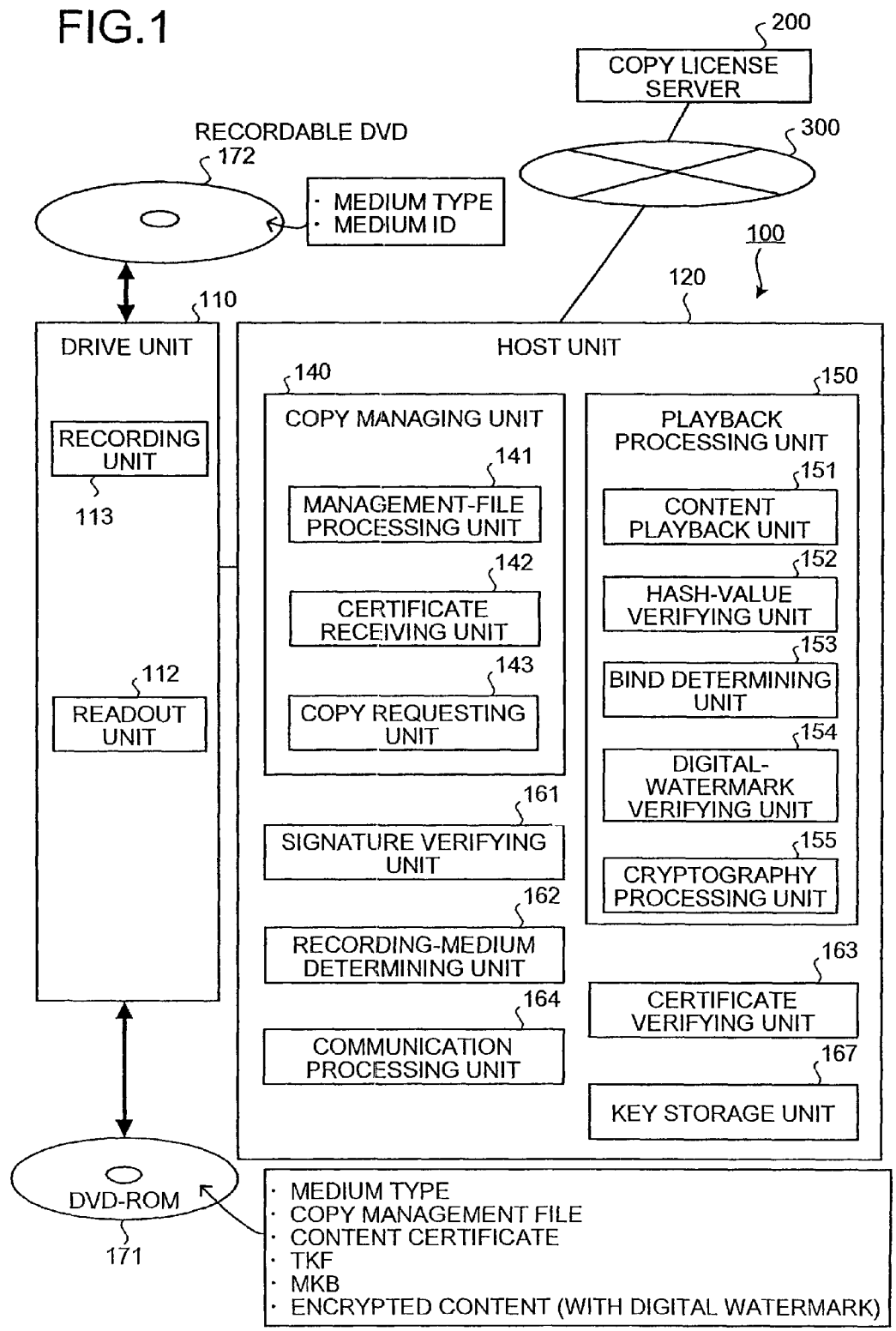
FIG. 1 is a functional block diagram of a digital versatile disc (DVD) recorder according to a first embodiment of the present invention.

A digital versatile disc (DVD)/high-definition (HD) DVD recorder (hereinafter, "DVD recorder") is cited as a content recording/playback apparatus that records and play back content on a HD DVD medium (hereinafter, "DVD medium"). As shown in FIG. 1, a DVD recorder 100 according to a first embodiment of the present invention is connected to a copy license server 200 via a network 300 such as the Internet.

The DVD recorder 100 includes a drive unit 110 and a host unit 120. The drive unit 110 and the host unit 120 are connected to each other by a general bus or a dedicated and specialized bus. The drive unit 110 records data on a recordable DVD 172, which is a data-writable DVD, and reads out data from the recordable DVD 172 and a DVD read-only memory (ROM) (hereinafter, "DVD-ROM) 171. The host unit 120, on the other hand, performs processing such as encryption and decryption of a title key of content.

When copying content on the DVD-ROM 171, for example, the DVD recorder 100 sends a copy-permission request for approval to copy content to the copy license server 200. Upon receiving the copy-permission request from the DVD recorder 100, the copy license server 200 verifies whether the DVD recorder 100 is a legitimate DVD recorder. If the DVD recorder 100 is a legitimate DVD recorder, the copy license server 200 creates a content certificate corresponding to the DVD-ROM 171, and transmits the content certificate to the DVD recorder 100. The DVD recorder 100 copies the content onto the DVD-ROM 171, and further records the content certificate received from the copy license server 200 on the DVD-ROM 171. Similar process is performed when copying content on the recordable DVD 172.

The DVD-ROM 171 stores therein a medium type, a copy management file, a content certificate, a title key file (TKF), a media key block (MKB), and encrypted content in which a predetermined digital watermark is embedded. Those data are recorded on the DVD-ROM 171 when the DVD-ROM 171 is manufacture. Therefore, a user cannot overwrite those data, and also cannot add new data onto the DVD-ROM 171.

The medium type indicates whether the DVD medium is a DVD-ROM or a recordable DVD. The medium type of the DVD-ROM 171 is DVD-ROM.

The copy management file stores therein an address, i.e., a Uniform Resource Locator (URL) of the copy license server 200 on the network 300 and information about a target DVD medium on which the content is to be copied.

The TKF stores therein a plurality of encrypted title keys, which are encrypted by using media keys, corresponding to a plurality of title content respectively. A title key is used to encrypt the corresponding title content.

The MKB is a set of media keys that can be calculated by a legitimate DVD player. A legitimate DVD player calculates a media key by performing a MKB processing with respect to a device private key possessed by the legitimate DVD player. The device private key is issued by a predetermined licenser, and provided only to legitimate DVD players. The encrypted content is encrypted by using the title key. A predetermined digital watermark is embedded in the content. The predetermined digital watermark is used to detect whether the content is illegally recorded on a DVD medium even if the encrypted content is converted to plaintext content.

The content certificate is bound to the content. Moreover, a signature for checking the validity of binding of the content certificate and the content is added into the content.

As shown in FIG. 2, a content certificate according to the first embodiment includes, after a header (not shown), a certificate type, a content sequence number, a content revocation list and a version number of the content revocation list, a content hash value, and a signature.

The content revocation list is a list of content sequence numbers of pirated content. The latest version of the content revocation list is stored in the DVD recorder 100.

The content hash value is obtained by applying a one-way function to a portion of the content. Every content has a unique hash value. Thus, every content has a unique content hash value, and therefore, a unique content certificate.

The signature is digitally added into the content sequence number, the content revocation list, the content hash value, and the certificate type respectively by using the private key corresponding to a public key cryptography held by a predetermined licenser. The signature is verified by using the public key corresponding to the private key, so that the data included in the content certificate can be verified whether the data is altered.

The content certificate also includes a certificate type. The certificate type indicates a type of a DVD medium on which the content certificate is recorded. A certificate type "0" indicates DVD-ROM, and "1" indicates a recordable DVD.

As shown in FIG. 1, the recordable DVD 172 stores therein a medium type and a medium identifier (ID). Those data are stored in a user-unrewritable area on the recordable DVD 172 before the content is copied thereon. The user-unrewritable area is an area, for example, a Lead-In area or a Read-Only area, where a user can not write data. The medium ID is a unique identifier assigned to the recordable DVD 172 when the recordable DVD 172 is manufactured. The medium type of the recordable DVD 172 is "recordable DVD", which is a read/write medium.

The drive unit 110 of the DVD recorder 100 includes a readout unit 112 and a recording unit 113. The readout unit 112 reads out data recorded on the DVD-ROM 171 or the recordable DVD 172. The readout unit 112 reads out, for example, the medium type, the copy management file, the content certificate, the TKF, the MKB, and the encrypted content from the DVD-ROM 171. On the other hand, the readout unit 112 reads out the medium type and the medium ID from the recordable DVD 172.

The recording unit 113 records data onto the recordable DVD 172. The data can be encrypted content, which can be content read out by the readout unit 112 from the DVD-ROM 171, or the content certificate received from the copy license server 200.

The host unit 120 includes a copy managing unit 140, a playback processing unit 150, a signature verifying unit 161, a recording-medium determining unit 162, a certificate verifying unit 163, a communication processing unit 164, and a key storage unit 167.

The copy managing unit 140 controls copying of content onto the recordable DVD 172 by the recording unit 113. The copy managing unit 140 includes a management-file processing unit 141, a certificate receiving unit 142, and a copy requesting unit 143.

The management-file processing unit 141 analyzes the copy management file, which the readout unit reads from the DVD-ROM 171 as a source DVD medium, and extracts the URL of the copy license server 200 contained in the copy management file.

The copy requesting unit 143 is connected to the URL, which is obtained by the management-file processing unit 141, and transmits the copy-permission request to the copy license server 200 to get approval to copy content from the DVD-ROM 171 to the recordable DVD 172.

Upon receiving the copy-permission request, the copy license server 200 verifies whether the DVD recorder 100 is a legitimate DVD recorder. If the DVD recorder 100 is a legitimate DVD recorder, the copy license server 200 sends a content certificate for the recordable DVD 172 to the DVD recorder 100. The certificate receiving unit 142 receives the content certificate.

The playback processing unit 150 includes a content playback unit 151, a hash-value verifying unit 152, a bind determining unit 153, a digital-watermark verifying unit 154, and a cryptography processing unit 155.

The cryptography processing unit 155 decrypts encrypted data thereby obtaining plaintext data. The cryptography processing unit 155 decrypts, for example, the encrypted title key by using the MKB and the device private key stored in the key storage unit 167, and then decrypts the encrypted content by using the decrypted title key. The encrypted title key and the MKB are read out from the DVD-ROM 171 by the readout unit 112.

The content playback unit 151 receives the plaintext content from the cryptography processing unit 155 and plays back the content. The content playback unit 151 performs various processing on the content so that content can be played back. Such processing include, but not limited to, decompression of content, conversion of digital content into analog content.

The hash-value verifying unit 152 calculates a hash value of content, and verifies whether the hash value corresponds to the hash value in the content certificate, which is read out from the DVD-ROM 171 by the readout unit 112. If the two hash values do not match, the hash-value verifying unit 152 informs the content playback unit 151 to abort playback of the content.

The digital-watermark verifying unit 154 checks whether a predetermined digital watermark is embedded in content, which is read out from the DVD-ROM 171 by the readout unit 112. If a predetermined digital watermark is found in the content, the digital-watermark verifying unit 154 informs the content playback unit 151 to abort playback of the content.

The bind determining unit 153 verifies whether a content certificate or an encryption key is bound to content.

The information bound to the content is called bind information. To prevent the content and the content certificate those are recorded on the recordable DVD 172 from copying onto another recordable DVD, the content needs to bind to the medium ID unique to the recordable DVD 172. When the DVD recorder 100 transmits the medium ID to the copy license server 200, the copy license server 200 transmits bind information based on the medium ID to the DVD recorder 100. When the DVD recorder 100 plays back the content, the bind determining unit 153 verifies whether a content certificate or an encryption key is bound to the recordable DVD 172 by verifying the bind information received from the copy license server 200.

Three methods are available for binding the content to the recordable DVD 172. A first method is to bind a content certificate to the medium ID of the recordable DVD 172. A second method is to bind an encryption key to the medium ID of the recordable DVD 172. A third method is a combination of the first and second methods.

With regard to the first method, the content certificate can be bound to the medium ID by using a following function f1:

$$\text{Bind information} = f1(\text{content certificate, medium ID}) \quad (1).$$

The function f1 is calculated by using a cryptographic algorithm. The examples of the cryptographic algorithm include, but not limited to, Advanced Encryption Standard (AES), a hash function such as the Secure Hash Algorithm 1 (SHA-1), or a combination of the AES and the SHA-1. Although Equation (1) lists the medium ID as a parameter of the function f1, any other parameter(s) can be used.

Moreover, an area for the medium ID can be defined in the content certificate. A signature together with the medium ID can be created in the area by using the private key issued by the predetermined licenser.

With regard to the second method, the key information can be bound to the medium ID by using a following function f2:

$$\text{Bind information} = f2(\text{Media\_Key, medium ID}) \quad (2)$$

where Media_Key is calculated from the MKB by using the device private key by using Equation (3):

$$\text{Media\_Key} = g1(\text{device private key, MKB}) \quad (3).$$

A title key is encrypted by using the Media_Key. The function f2 can be calculated by the cryptographic algorithm mentioned above. Although Equation (2) lists the medium ID as a parameter of the function f2, any other parameter(s) can be used.

Instead of Equation (3), Media_Key can be calculated by using Equation (4):

$$\text{Media\_Key} = g2(\text{device private key, MKB, medium ID}) \quad (4),$$

i.e., the medium ID can also be included to encrypt the title key.

The copy managing unit 140 is used when the content is copied onto the recordable DVD 172. The playback processing unit 150 is used when playing back content read from the DVD-ROM 171 and/or the recordable DVD 172. The signature verifying unit 161, the recording-medium determining unit 162, the certificate verifying unit 163, and the communication processing unit 164 are used when the content is copied and played back.

The signature verifying unit 161 verifies whether the signature included in the content certificate is a legitimate signature, and stops detection of predetermined digital watermark by the digital-watermark verifying unit 154 when the result of the verification indicates that the content certificate is a legitimate signature.

The recording-medium determining unit 162 determines whether a medium type of the DVD medium (the DVD-ROM 171 or the recordable DVD 172) is DVD-ROM or recordable DVD.

The certificate verifying unit 163 verifies whether the medium type corresponds to a certificate type recorded in the content certificate.

The communication processing unit 164 performs communication with the copy license server 200. When performing communication with the copy license server 200, the communication processing unit 164 processes a physical layer, a data link layer, a network layer, and a transport layer.

The key storage unit 167 stores therein a device private key issued by a predetermined licenser, a public key, an encryption key that is required by the copy license server 200 for verifying the DVD recorder 100, and the like. The device private key is used to decrypt the MKB. The public key is used to verify the signature included in the content certificate. The device private key is stored in the key storage unit 167 such that it does not leak outside of the DVD recorder 100.

The private key, which is used to create the signature included in the content certificate, is held by the predetermined licenser or the copy license server 200. The public key is a key corresponding to the private key. Namely, the DVD recorder 100 has the public key to verify the signature, but does not have the private key. Therefore, the DVD recorder 100 cannot illegally change the content certificated in the recordable DVD 172.

Figure 3:
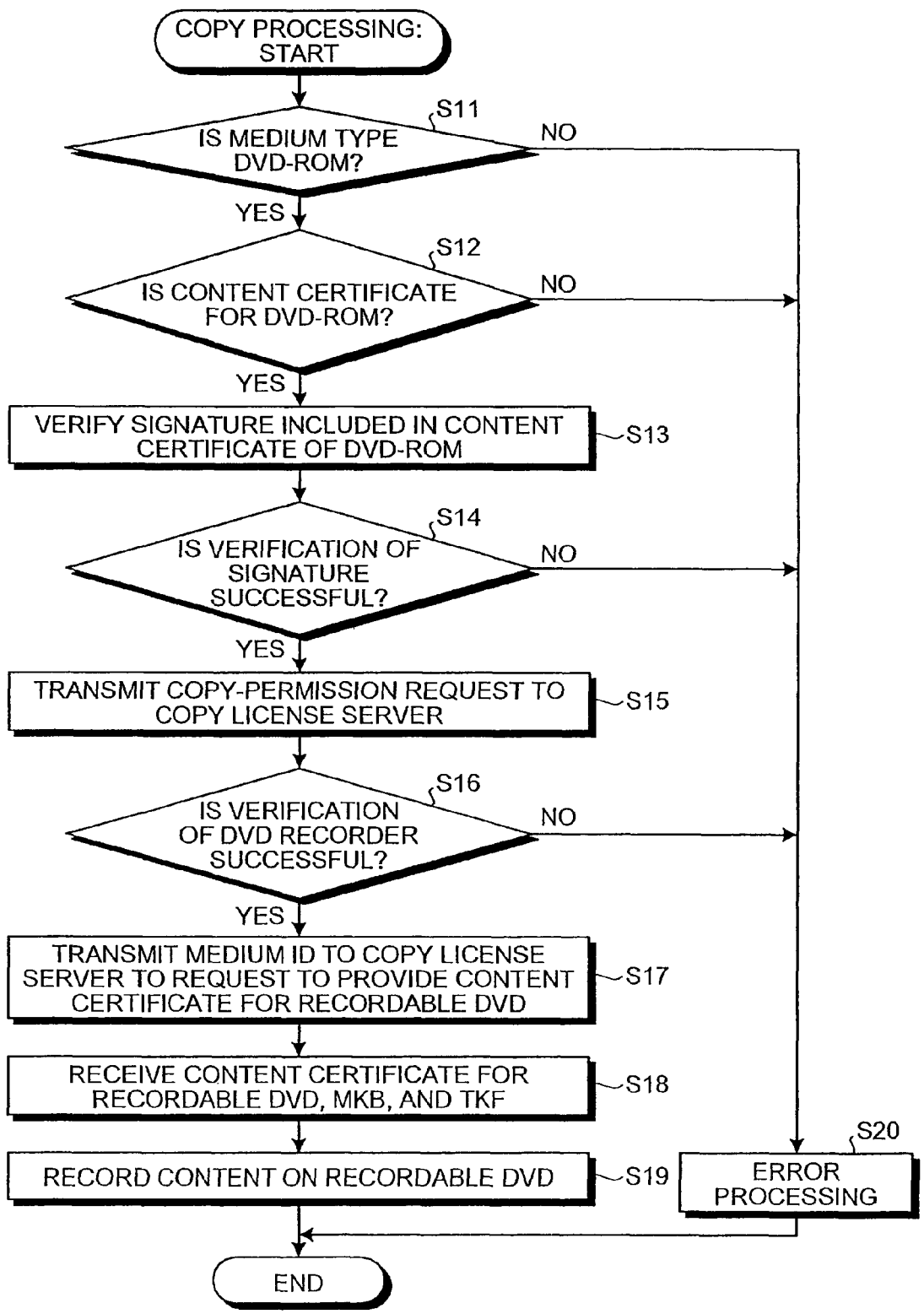
FIG. 3 is a flowchart of a copy processing according to the first embodiment.

A copy processing for copying content according to the first embodiment is described below with reference to FIG. 3. In the first embodiment, content recorded on the DVD-ROM 171 is copied onto the recordable DVD 172.

First, the recording-medium determining unit 162 determines whether a medium type of a source medium (i.e., DVD-ROM 171) is DVD-ROM (step S11). If the medium type is not DVD-ROM, i.e., if the medium type is recordable DVD (No at step S11), the recording-medium determining unit 162 performs an error processing (step S20) because the content is not allowed to be copied any more.

If the medium type is DVD-ROM (Yes at step S11), the certificate verifying unit 163 verifies whether the content certificate read from the source medium is for DVD-ROM (step S12). If the certificate type is not for DVD-ROM, i.e., the certificate type is for recordable DVD (No at step S12), the certificate verifying unit 163 performs the error processing (step S20) because the content is not allowed to be copied any more.

If the certificate type is for DVD-ROM (Yes at step S12), the signature verifying unit 161 verifies a signature included in the content certificate by using the public key stored in the key storage unit 167 (step S13). If the verification of the signature is not successful (No at step S14), the signature verifying unit 161 performs the error processing (step S20) because the source DVD medium is illegal. If the verification of the signature is successful (Yes at step S14), the copy requesting unit 143 transmits a copy-permission request to the copy license server 200 to get approval to copy the content (step S15).

Upon receiving the copy-permission request, the copy license server 200 verifies whether the DVD recorder 100 is a legitimate DVD recorder. Verification of the DVD recorder 100 by the copy license server 200 can be performed unidirectionally or bi-directionally. It is possible to charge a fee for the verification.

If the verification of the DVD recorder 100 is not successful (No at step S16), the copy license server 200 informs the DVD recorder 100 to perform the error processing (step S20) because the DVD recorder 100 is illegal.

If the verification of the DVD recorder 100 is successful (Yes at step S16), the copy requesting unit 143 transmits a content certificate request together with a medium ID of a target recording medium, i.e., the recordable DVD 172, to the copy license server 200 to request the copy license server 200 to issue a content certificate for the recordable DVD 172 (step S17).

Upon receiving the content certificate request from the copy requesting unit 143, the copy license server 200 transmits a content certificate, a MKB, and a TKF for the recordable DVD 172 to the certificate receiving unit 142 (step S18).

The content certificate for the recordable DVD 172 includes a signature corresponding to a hash value of a portion of the content. Namely, the DVD recorder 100 informs the copy license server 200 about the hash value, so that the copy license server 200 can issue the content certificate that includes the signature corresponding to the hash value. Five methods are available for informing the copy license server 200 about the hash value. In a first method, the DVD recorder 100 transmits the content sequence number to the copy license server 200. In a second method, the DVD recorder 100 transmits a portion of the content, from which the hash value is to be calculated, to the copy license server 200. In a third method, the DVD recorder 100 transmits the hash value to the copy license server 200. In a fourth method, the DVD recorder 100 transmits the content certificate to the copy license server 200. A fifth method is a combination of the first to fourth methods.

In the first method, each content sequence number and each content certificate corresponding to the content sequence number are recorded in pairs on the copy license server 200 in advance. The copy license server 200 transmits a content certificate corresponding to the content sequence number that is transmitted from the DVD recorder 100. Each hash value is calculated in advance, so that the copy license server 200 can instantly transmit the content certificate for the recordable DVD 172 upon receiving the content certificate request. Alternatively, if the signature included in the content certificate for the recordable DVD 172 is created by the predetermined licenser in advance, and further if the content certificate including the signature is stored in the copy license server 200, the copy license server 200 does not have to hold the private key. Thus, the private key can be held by the licenser only.

In the second method, the copy license server 200 receives a portion of the content from the DVD recorder 100, and calculates a hash value based on the received portion of the content. The copy license server 200 issues a content certificate including the calculated hash value, and instantly creates a signature by using the private key issued from the predetermined licenser on the content certificate. Then, the copy license server 200 transmits the content certificate to the DVD recorder 100.

In the third method, the copy license server 200 instantly creates a signature by using the private key issued from the predetermined licenser, and adds the signature on the hash value received from the DVD recorder 100 to create a content certificate. Then, the copy license server 200 transmits the content certificate to the DVD recorder 100.

In the fourth method, the copy license server 200 rewrites the certificate type of the received content certificate for the DVD-ROM 171 to for recordable DVD, and creates a signature by using the private key to add thereinto. Then, the copy license server 200 transmits the content certificate to the DVD recorder 100.

If the content recorded on the DVD-ROM 171 is copied onto the recordable DVD 172 as it is, the hash value is also copied as it is. Therefore, any one of the first to fourth methods is used to inform the copy license server 200 about the hash information.

When the DVD recorder 100 transmits data to the copy license server 200 by any one of the first to fourth methods, the DVD recorder 100 can encrypt the data, or add a signature into the data to ensure that the data is not altered.

If a format of the content recorded on the DVD-ROM 171 is converted, for example, to another compression format to record on the recordable DVD 172, the hash values before and after the format conversion are different. In this case, either the second or the third method is used to inform the copy license server 200 about the hash information.

When the fourth method is used, the copy license server 200 can verify whether the certificate type is for DVD-ROM and also verify a signature included in the content certificate. In this case, the DVD recorder 100 can omit to perform the procedures in the steps S12 to S14. Consequently, the signature verifying unit 161 and the certificate verifying unit 163 are not required.

Referring again to FIG. 3, the recording unit 113 copies the content recorded on the DVD-ROM 171 onto the recordable DVD 172 (step S19). At this time, the content certificate for the recordable DVD 172, the MKB, and the TKF, which are received from the copy license server 200, are also recorded on the recordable DVD 172. The content recorded on the DVD-ROM 171 is completely copied onto the recordable DVD 172.

In the first embodiment, the MKB and the TKF are transmitted from the copy license server 200. If a version of the MKB stored in the DVD-ROM 171 is newer than the same for the copy license server 200, the MKB and the TKF those are stored on the DVD-ROM 171 are copied onto the recordable DVD 172.

A playback processing for playing back the content according to the first embodiment is described below with reference to FIGS. 4 and 5. In this case, the content copied onto the recordable DVD 172 is to be played back.

First, the certificate verifying unit 163 verifies whether a DVD medium (the recordable DVD 172) contains a content certificate therein (step S31). If the recordable DVD 172 contains a content certificate therein (Yes at step S31), the certificate verifying unit 163 verifies consistency between the content certificate and the recordable DVD 172 (step S32).

If the verification of the consistency between the content certificate and the recordable DVD 172 is not successful (No at step S33), the certificate verifying unit 163 informs the content playback unit 151 to abort playback of the content (step S44), and performs an error processing (step S45) because the content certificate is probably illegally-created.

If the verification of the consistency between the content certificate and the recordable DVD 172 is successful (Yes at step S33), the certificate verifying unit 163 checks the content revocation list (step S34). The certificate verifying unit 163 verifies whether a content sequence number included in the content certificate is listed in the content revocation list (step S35). If the content sequence number is listed in the content revocation list (Yes at step S35), the certificate verifying unit 163 informs the content playback unit 151 to abort playback of the content (step S44), and performs the error processing (step S45) because the recordable DVD 172 is determined to be a pirated DVD medium.

If the content sequence number is not listed in the content revocation list (No at step S35), the cryptography processing unit 155 decrypts the encrypted title key included in the TKF by using the device private key and the MKB to obtain the decrypted title key (step S36).

If a medium type of the DVD medium is recordable DVD (step S37), the bind determining unit 153 obtains and verifies bind information (step S38). The bind determining unit 153 verifies whether the obtained bind information corresponds to bind information transmitted from the copy license server 200, and thus determines whether the content certificate or each key information is bound to the recordable DVD 172 (step S39). If the obtained bind information does not correspond to the bind information transmitted from the copy license server 200 (No at step S39), the bind determining unit 153 informs the content playback unit 151 to abort playback of the content (step S44), and performs the error processing (step S45).

If a medium type of the DVD medium is DVD-ROM (step S37), the procedures in the steps S38 and S39 are skipped.

If the obtained bind information corresponds to the bind information transmitted from the copy license server 200 (Yes at step S39), the cryptography processing unit 155 decrypts encrypted content recorded on the recordable DVD 172 by using the title key, and the content playback unit 151 starts playing back the decrypted content (step S40).

When the content is played back, the hash-value verifying unit 152 calculates a hash value of the content (step S41). The hash-value verifying unit 152 verifies whether the calculated hash value corresponds to the hash value included in the content certificate (step S42). If the calculated hash value does not correspond to the hash value included in the content certificate (No at step S42), the hash-value verifying unit 152 informs the content playback unit 151 to abort playback of the content (step S44), and performs the error processing (step S45).

If the calculated hash value corresponds to the hash value included in the content certificate (Yes at step S42), the content playback unit 151 continues to play back the content (step S43).

Figure 5:
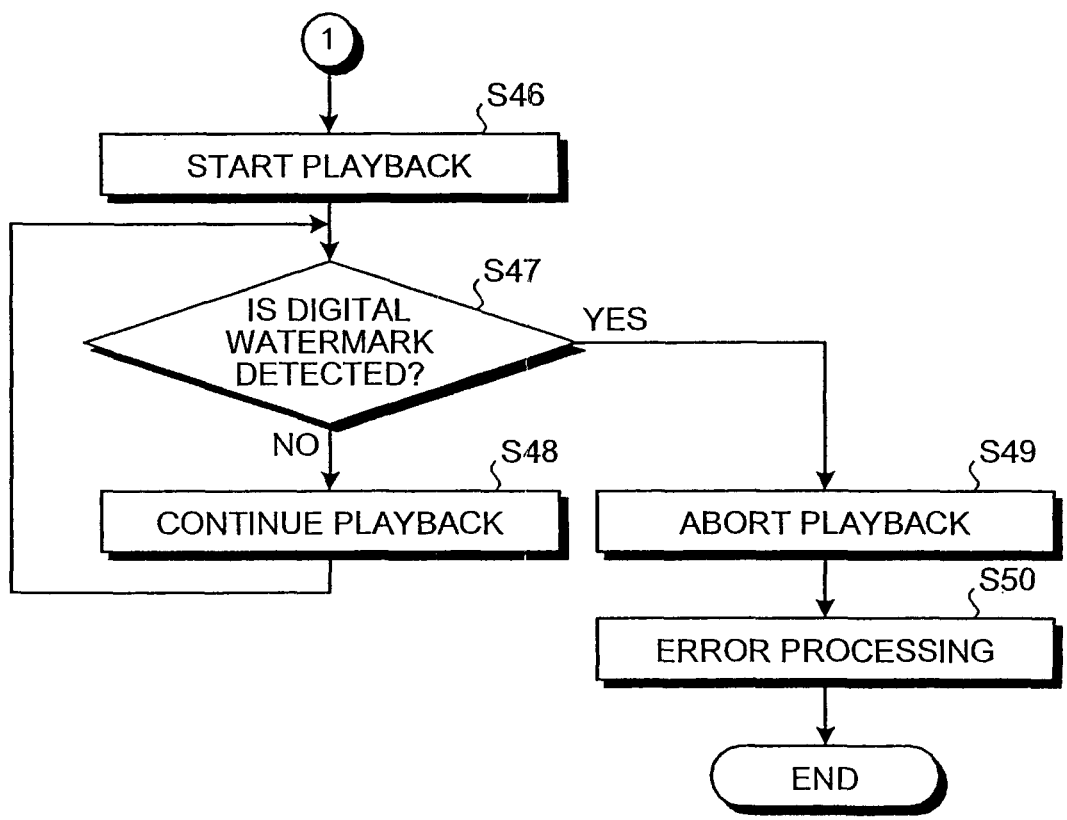
FIG. 5 is a continuation of the flowchart shown in FIG. 4.

On the contrary, if it is determined at the step S31 that the recordable DVD 172 does not contain a content certificate therein (No at step S31), the content playback unit 151 starts playing back the content (step S46 in FIG. 5).

Then, the digital-watermark verifying unit 154 detects whether a predetermined digital watermark is embedded in the content (step S47). If the digital-watermark verifying unit 154 detects a predetermined digital watermark embedded in the content (Yes at step S47), the digital-watermark verifying unit 154 informs the content playback unit 151 to abort playback of the content (step S49), and performs an error processing (step S50) because the content is determined to be illegally-recorded.

If the digital-watermark verifying unit 154 does not detect a predetermined digital watermark in the content (No at step S47), the content playback unit 151 continues to play back the content (step S48).

Figure 6:
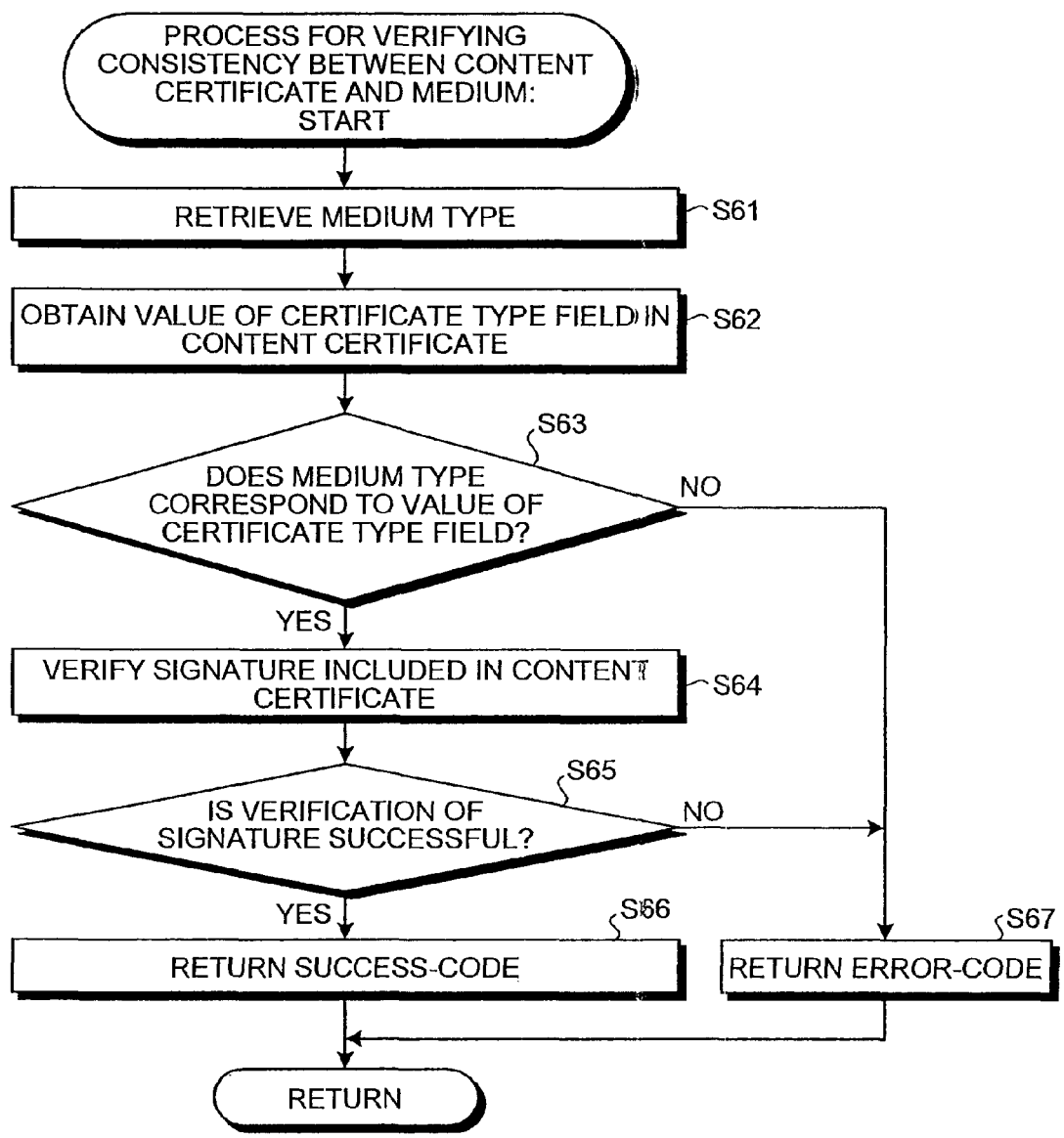
FIG. 6 is a flowchart of a process for verifying consistency between a content certificate and a DVD medium according to the first embodiment.

The procedure for verifying the consistency between the content certificate and the DVD medium at the step S32 is described in detail with reference to FIG. 6.

First, the certificate verifying unit 163 retrieves a medium type of the DVD medium (step S61). Then, the certificate verifying unit 163 obtains a value of the certificate type field included in the content certificate that is recorded on the DVD medium (step S62). The certificate verifying unit 163 verifies whether the medium type corresponds to the value of the certificate type field (step S63).

If the medium type does not correspond to the value of the certificate-type field (No at step S63), the certificate verifying unit 163 determines the content certificate is illegally-created, and returns an error-code that indicates a failure of the verification (step S67).

If the medium type corresponds to the value of the certificate type field (Yes at step S63), the signature verifying unit 161 verifies a signature included in the content certificate (step S64). If the verification of the signature is successful (Yes at step S65), the signature verifying unit 161 returns a success-code that indicates successfulness of the verification (step S66). If the verification of the signature is not successful (No at step S65), the signature verifying unit 161 determines the content certificate is illegally-created, and returns the error-code (step S67). At the step S33, it is determined that verification is successful if a success-code is returned at the step S66, and that verification is unsuccessful if an error-code is returned at the step S67.

As described above, when copying content onto a DVD medium, the DVD recorder 100 according to the first embodiment sends a copy-permission request to the copy license server 200 to give approval to copy the content. Upon receiving the copy-permission request, the copy license server 200 verifies the DVD recorder. If the verification of the DVD recorder 100 is successful, the copy license server 200 transmits a content certificate corresponding to a medium type of the DVD medium to the DVD recorder 100. Then, the DVD recorder 100 copies the content together with the received content certificate onto the DVD medium. Therefore, the content can be protected from being illegally copied. Even if a content certificate is copied by an illegally-altered DVD recorder, the DVD recorder 100 can detect that the content certificate is illegally-copied during playback of content and abort playback. Thus, a distribution of pirated DVDs can be prevented effectively.

On the other hand, when copying content onto the recordable DVD 172, the DVD recorder 100 sends a content certificate request to the copy license server 200 to give approval to copy the content. The copy license server 200 verifies the DVD recorder 100. If the verification of the DVD recorder 100 is successful, the copy license server 200 sends a content certificate to the DVD recorder 100 whereby the DVD recorder 100 can copy the content onto the recordable DVD 172. Therefore, the content can be prevented from being illegally copied by detecting an illegally-altered DVD recorder before the content is copied by the illegally-altered DVD recorder.

The DVD recorder 100 records a content certificate including a signature that is created by using the private key, which corresponds to the public key cryptography, held by the predetermined licenser only, on a DVD medium. Namely, all DVD recorders do not have the private key, so that the DVD recorders themselves can not create a signature. Thus, it is possible to prevent the DVD recorder 100 from playing back illegally-copied content, because the DVD recorder 100 can detect whether a content certificate included in the content is illegally-created by verifying a signature therein.

The DVD recorder 100 according to the first embodiment copies content recorded on the DVD-ROM 171 onto the recordable DVD 172. In a second embodiment, a DVD recorder 700 copies content recorded on the DVD-ROM 171 onto a data storage unit 701 in the DVD recorder 700, and then moves the copied content stored in the data storage unit 701 to the recordable DVD 172.

Figure 7:
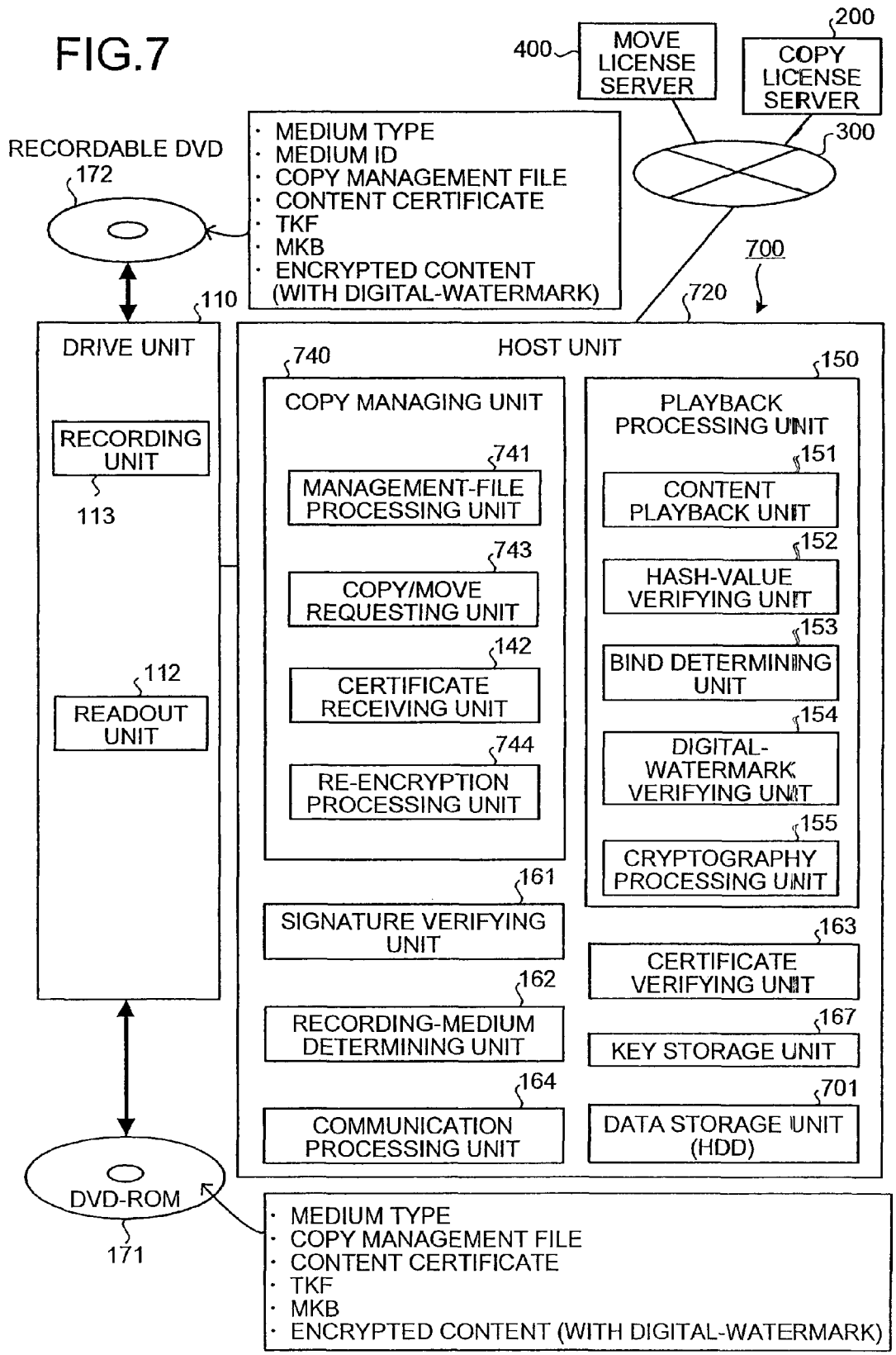
FIG. 7 is a functional block diagram of a DVD recorder according to a second embodiment.

As shown in FIG. 7, the DVD recorder 700 according to the second embodiment is connected to the copy license server 200 and a move license server 400 via the network 300 such as the Internet.

The copy license server 200 performs the same functions as in the first embodiment. The move license server 400 verifies the DVD recorder 700 upon receiving a move-permission request for approval to move content from the DVD recorder 700. If the verification of the DVD recorder 700 is successful, the move license server 400 allows the DVD recorder 700 to move the content. The move license server 400 creates a content certificate for a target DVD medium, i.e., the recordable DVD 172 to certify that the content is allowed to move thereto, and transmits the content certificate to the DVD recorder 700.

The data structure of the content certificate recorded on the DVD-ROM 171 according to the second embodiment is identical to that in the first embodiment.

The DVD recorder 700 includes the drive unit 110 and a host unit 720. The drive unit 110 includes the recording unit 113 and the readout unit 112. The recording unit 113 records data on the writable recordable DVD 172. The readout unit 112 reads out data from the recordable DVD 172 or the DVD-ROM 171. The host unit 720 performs various processing including encryption and decryption of a title key of content. The drive unit 110 and the host unit 720 are connected to each other by a general bus or a dedicated specialized bus.

The host unit 720 includes a copy managing unit 740, the playback processing unit 150, the signature verifying unit 161, the recording-medium determining unit 162, the certificate verifying unit 163, the communication processing unit 164, the key storage unit 167, and the data storage unit 701.

The playback processing unit 150, the signature verifying unit 161, the recording-medium determining unit 162, the certificate verifying unit 163, the communication processing unit 164, and the key storage unit 167 are identical to that of the first embodiment. Therefore, explanation of those units is omitted.

The data storage unit 701 is a storage medium such as a hard disk drive (HDD) or a memory to store therein the encrypted content, the TKF, the content certificate, and the like, which are recorded on the DVD-ROM 171.

The copy managing unit 740 includes the management-file processing unit 141, the certificate receiving unit 142, a copy/move requesting unit 743, and a re-encryption processing unit 744. The management-file processing unit 141 is identical to that of the first embodiment. Therefore, the description of the management-file processing unit 141 is omitted.

If content is to be copied, the copy/move requesting unit 743 connects to a URL of the copy license server 200, which is directed by the management-file processing unit 141, and transmits a copy-permission request to the copy license server 200 to get approval to copy the content. If content is to be moved, the copy/move requesting unit 743 connects to a URL of the move license server 400, which is directed by the management-file processing unit 141, and transmits a move-permission request to the move license server 400 to get approval to move the content.

If the copy license server 200 gives approval to copy the content, the certificate receiving unit 142 receives a content certificate and the like from the copy license server 200. If the move license server 400 gives approval to move the content, the certificate receiving unit 142 receives a content certificate and the like from the move license server 400.

When the content recorded on the DVD-ROM 171 is to be copied onto the data storage unit 701, the re-encryption processing unit 744 re-encrypts the content. When the content stored in the data storage unit 701 is to be moved to the recordable DVD 172, the re-encryption processing unit 744 re-encrypts the content.

Figure 8:
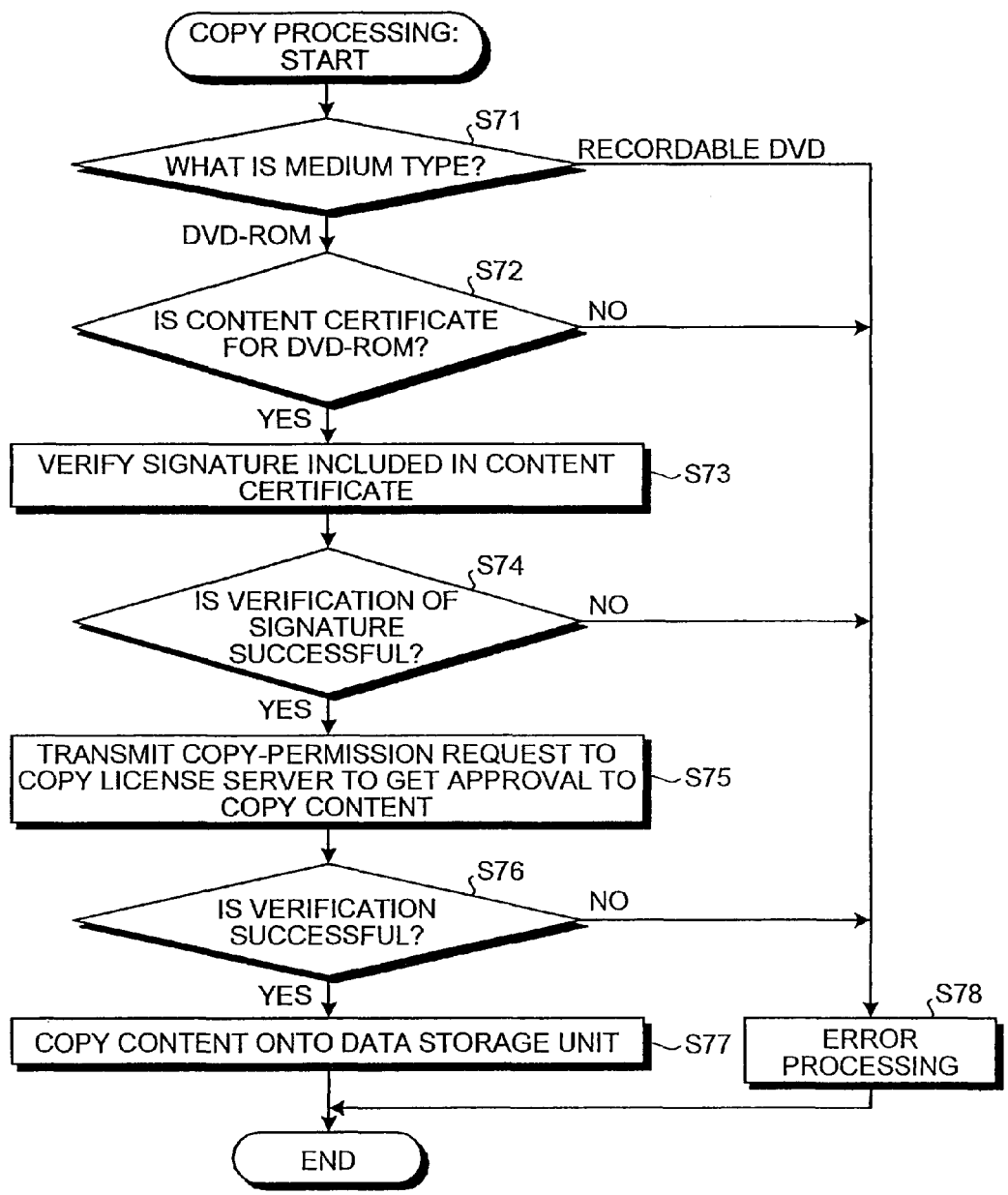
FIG. 8 is a flowchart of a copy processing according to the second embodiment.

The copy processing for copying content according to the second embodiment is described below with reference to FIG. 8. First, a user inputs either a copy instruction or a move instruction by using an operating unit (not shown) in the DVD recorder 700. If the content recorded on the DVD-ROM 171 is to be copied onto the data storage unit 701, the user inputs a copy instruction to the operating unit. Upon receiving the copy instruction from the user, the DVD recorder 700 executes the copy processing shown in FIG. 8.

The recording-medium determining unit 162 determines whether a medium type of a source DVD medium is DVD-ROM (step S71). If the medium type is not DVD-ROM, i.e., if the medium type is recordable DVD, the recording-medium determining unit 162 performs an error processing (step S78) to abort the copy processing, because the content is not allowed to be copied any more.

If the medium type is DVD-ROM, the certificate verifying unit 163 verifies whether a certificate type of a content certificate included in the content is for DVD-ROM (step S72). If the certificate type is not for DVD-ROM, i.e., if the certificate type is for recordable DVD (No at step S72), the certificate verifying unit 163 performs the error processing (step S78) to abort the copy processing, because the content is not allowed to be copied any more.

The signature verifying unit 161 verifies a signature included in the content certificate by using the public key stored in the key storage unit 167 (step S73). If the verification of the signature is not successful (No at step S74), the signature verifying unit 161 performs the error processing (step S78) to abort the copy processing, because the content is determined to be illegally-copied.

If the verification of the signature is successful (Yes at step S74), the copy/move requesting unit 743 transmits a copy-permission request to the copy license server 200 (step S75).

Upon receiving the copy-permission request, the copy license server 200 verifies the DVD recorder 700. If the verification of the DVD recorder 700 is not successful (No at step S76), the copy license server 200 informs to the DVD recorder 700 to perform the error processing (step S78), i.e., to abort the copy processing, because the DVD recorder 700 is determined to be an illegal DVD recorder.

If the verification of the DVD recorder 700 is successful (Yes at step S76), the recording unit 113 copies the content recorded on the DVD-ROM 171 onto the data storage unit 701 (step S77).

Two methods are available for executing the copy processing. In a first method, an encrypted title key included in the TKF is decrypted by using the device private key stored in the key storage unit 167 and the MKB recorded on the DVD-ROM 171. Then, the plaintext title key is bound to the DVD recorder 700. To bind the title key to the DVD recorder 700, the title key is encrypted by using a key or an ID those are unique to the DVD recorder 700, and stored in the data storage unit 701. Those processes are corresponding to the re-encryption of the title key in the TKF. Then, the encrypted content recorded on the DVD-ROM 171 is copied onto the data storage unit 701 without being re-encrypted.

In a second method, in the same manner as the procedures for playing back the content, an encrypted title key is decrypted, and the encrypted content is also decrypted by using the plaintext title key. The plaintext content is bound to the DVD recorder 700. To bind the content to the DVD recorder 700, the content is encrypted by using a key or an ID those are unique to the DVD recorder 700, and stored in the data storage unit 701. If a format of the content is converted, for example, to a compression format, the encrypted content needs to be decrypted to plaintext content. In this case, the second method is to be employed. In the second method, the TKF needs not be used to decrypt the content. Therefore, it is not necessary to copy the TKF onto the data storage unit 701.

The content stored in the data storage unit 701 is encrypted by using a key unique to the DVD recorder 700. Therefore, the device private key provided by the predetermined licenser, the content certificate, and the content sequence number need not be used to play back the encrypted content. Therefore, when the content is copied onto the data storage unit 701, it is not necessary to record the content certificate on the data storage unit 701.

Thus, it is not necessary to request a content certificate to the copy license server 200. Alternatively, the DVD recorder 700 transmits the content certificate to the copy license server 200, and causes the copy license server 200 to verify whether a certificate type of the content certificate is for DVD-ROM (step S72) or to verify a signature included in the content certificate by using the public key stored in the key storage unit 167 (step S73), so that the processes performed by the DVD recorder 700 can be simplified.

Figure 9:
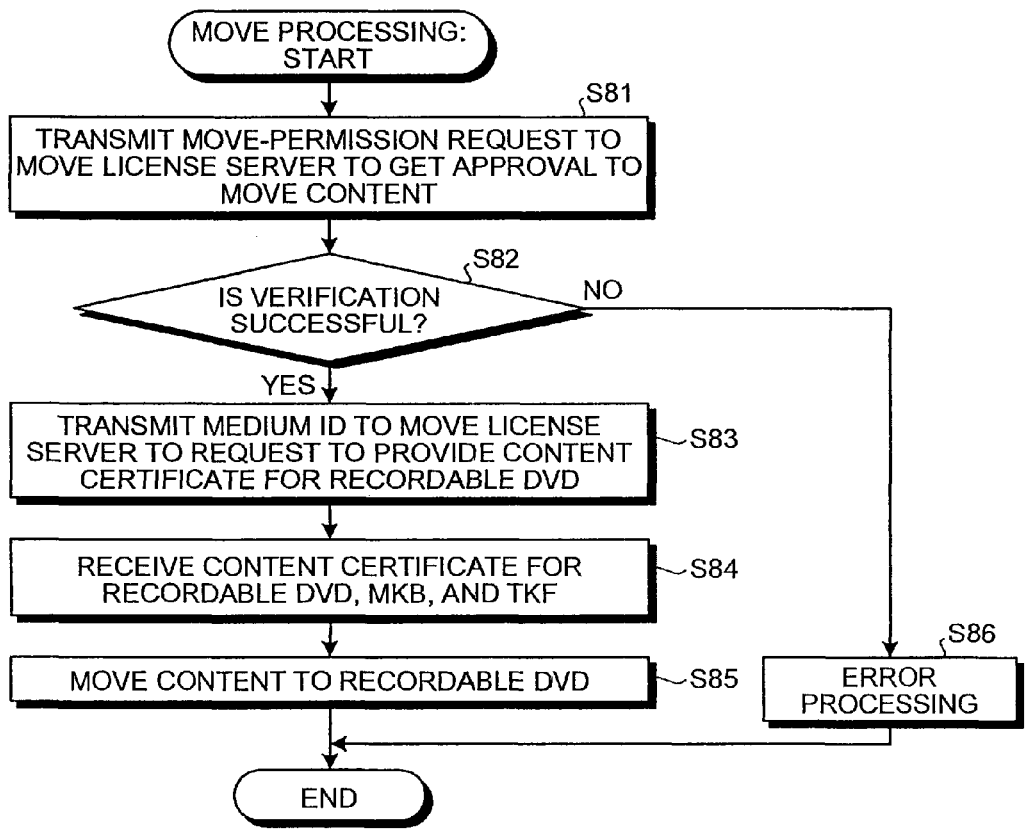
FIG. 9 is a flowchart of a move processing according to the second embodiment.

A move processing for moving the content stored in the data storage unit 701 to the recordable DVD 172 are described below with reference to FIG. 9. In the move processing, a user inputs a move instruction by using the operating unit in the DVD recorder 700. Upon receiving the move instruction, the DVD recorder 700 executes the move processing shown in FIG. 9.

When the DVD recorder 700 receives the move instruction, the copy/move requesting unit 743 transmits a move-permission request to the move license server 400 (step S81).

The move license server 400 verifies whether the DVD recorder 700 is a legitimate DVD recorder. In the same manner as the first embodiment, the verification of the DVD recorder 700 can be performed by the move license server 400 unidirectionally, but not limited to. The verification can be performed bi-directionally between the move license server 400 and the DVD recorder 700. It is also possible to charge a fee for the verification.

If the verification of the DVD recorder 700 is not successful (No at step S82), the move license server 400 instructs the DVD recorder 700 to perform an error processing (step S86), i.e., to abort the move processing, because the DVD recorder 700 is determined to be an illegally-altered DVD recorder.

If the verification of the DVD recorder 700 is successful (Yes at step S82), the copy/move requesting unit 743 transmits a medium ID of the recordable DVD 172, which is a target recording medium, to the move license server 400 to request a content certificate for the recordable DVD 172 (step S83).

A content certificate including a signature, which is created by the private key held by the predetermined licenser, is required to move the content stored in the data storage unit 701 to the recordable DVD 172. The content certificate needs to include a hash value of a portion of the content. Therefore, it is necessary to inform the move license server 400 about the hash value, so that the move license server 400 creates a signature in the hash value. Five methods are available for informing the move license server 400 about the hash value.

A first method is to transmit the content sequence number. A second method is to transmit partial information of the content to be hashed. A third method is to transmit the hash value of the content that is calculated by the DVD recorder 700. A fourth method is to transmit the content certificate recorded on the DVD-ROM 171. A fifth method is a combination of the first to fourth methods.

When the content recorded on the DVD-ROM 171 is to be copied onto the data storage unit 701, if the content has not been re-encoded or not subjected to format conversion, the hash value of the portion of the content is not changed. Namely, the hash value included in the content certificate recorded on the DVD-ROM 171 is identical to that of the recordable DVD 172. Therefore, when the content, which is not re-encode or not subjected to format conversion, is copied onto the data storage unit 701, the first method is to be employed at the copy processing. Moreover, in case the first or second method is employed at the move processing, the content sequence number or the content certificate are also to be stored in the data storage unit 701 when the content is copied onto the data storage unit 701. When the content is moved from the data storage unit 701 to the recordable DVD 172, any one of the first to fourth methods is to be employed to request a content certificate to the move license server 400.

When the content recorded on the DVD-ROM 171 is copied onto the data storage unit 701, if the content has been re-encoded or subjected to format conversion, the second or third method is to be employed to request a content certificate to the move license server 400.

At the step S84, upon receiving the move-permission request from the copy/move requesting unit 743, the move license server 400 transmits a content certificate for the recordable DVD 172, a MKB, and a TKF to the certificate receiving unit 142 (step S84).

Then, the recording unit 113 moves the content stored in the data storage unit 701 to the recordable DVD 172 (step S85). At this time, if the content recorded on the DVD-ROM 171 is copied onto the data storage unit 701 by the first method of executing the copy processing, the TKF stored in the data storage unit 701 is to be deleted. If the content recorded on the DVD-ROM 171 is copied onto the data storage unit 701 by the second method of executing the copy processing, the content stored in the data storage unit 701 is to be deleted. The content certificate for the recordable DVD 172, the MKB, and the TKF, which are received from the move license server 400, are also recorded on the recordable DVD 172. In the event, the content stored in the data storage unit 701 is completely moved to the recordable DVD 172.

The playback processing for playing back the content recorded on the recordable DVD 172 are identical to that of the first embodiment.

In the DVD recorder 700 according to the second embodiment, the content recorded on the DVD-ROM 171 is copied onto the data storage unit 701, and then the content stored in the data storage unit 701 is moved to the recordable DVD 172. When the content stored in the data storage unit 701 is moved to the recordable DVD 172, the DVD recorder 700 transmits a move-permission request to the move license server 400 to get approval to move the content. When the DVD recorder 700 receives a content certificate corresponding to a medium type of the recordable DVD 172 from the move license server 400, the DVD recorder 700 can move the content to the recordable DVD 172, and record the content certificate on the recordable DVD 172. In the event, the DVD recorder 700 can move the content to the recordable DVD 172 completely. Even if a content certificate is illegally-copied by an illegally-altered DVD recorder, the DVD recorder 700 can detect the illegally-copied content certificate during playback of the content, and abort playback of the content. Thus, the DVD recorder 700 makes it possible to protect an illegal copy of the content by preventing an illegal movement of a content certificate.

Moreover, when the content is moved to the recordable DVD 172, the DVD recorder 700 transmits a move-permission request to the move license server 400 to get approval to move the content. The move license server 400 verifies whether the DVD recorder 700 is a legitimate DVD recorder. If the verification of the DVD recorder 700 is successful, the move license server 400 allows the DVD recorder 700 to move the content to the recordable DVD 172. Therefore, it is possible to detect an illegally-altered DVD recorder before the content is illegally-moved to other DVD medium. Thus, the DVD recorder 700 can prevent illegal copy of the content.

In the first and second embodiments, a source DVD medium of content is a DVD-ROM. However, with the popularization of a fiber-optic cable or an asymmetric digital subscriber line (ADSL), a high-speed access to a network makes it possible to distribute content via the Internet and also to record the distributed content on a recordable DVD medium. With due consideration of user-friendliness, download content preferably includes features equivalent of a package DVD-ROM. Namely, the download content preferably includes a feature capable of being copied on a recordable DVD medium.

In the first and second embodiments, content recorded on the DVD-ROM 171 can be copied depending on a certificate type of a content certificate. In a third embodiment of the present invention, download content recorded on a recordable DVD is copied onto other recordable DVD.

Therefore, a content certificate recorded on a DVD medium according to the third embodiment is different from that of the first and second embodiments.

Figure 10:
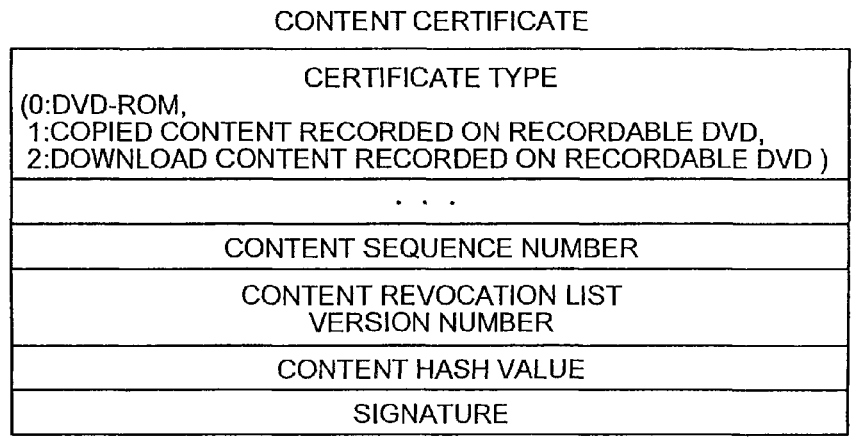
FIG. 10 is an example of a content certificate according to a third embodiment.

As shown in FIG. 10, the content certificate according to the third embodiment includes, in the same manner as the first embodiment, after a header (not shown), a certificate type, a content sequence number, a content revocation list, a content hash value, and a signature. The content sequence number, the content revocation list, the content hash value, and the signature are identical to that of the first embodiment.

The certificate type according to the third embodiment records a type of content. Any one of content recorded on a DVD-ROM, copied content recorded on a recordable DVD, and download content recorded on a recordable DVD is defined in a field of the certificate type.

In the example shown in FIG. 10, the certificate type "0" denotes content recorded on a DVD-ROM, "1" denotes copied content recorded on a recordable DVD, and "2" denotes download content recorded on a recordable DVD. The certificate type, however, can be specified by using other codes.

A configuration of a DVD recorder according to the third embodiment is identical to the DVD recorder 700 according to the second embodiment (see FIG. 7). It is assumed that download content recorded on the recordable DVD 172, which is a source DVD medium, is to be copied/moved onto other recordable DVD as a target DVD medium. Namely, the source DVD medium is denoted by "the recordable DVD 172", and the target DVD medium is denoted by any one of "the target recordable DVD", "the copying target DVD medium", "the moving target DVD medium", and the like.

In the DVD recorder 700 according to the third embodiment, a certificate type of a content certificate, which the copy/move requesting unit 743 requests to the copy license server 200 or the move license server 400, is determined by a medium type of a source DVD medium, a type of content, a target DVD medium, and a type of action (copy/move).

As shown in FIG. 11, a content certificate which certificate type is "copy content" is requested when content recorded on the DVD-ROM 171 is copied onto a target recordable DVD, or when copied content stored in the data storage unit 701 is move to the recordable DVD 172, or when download content stored in the data storage unit 701 is copied onto the recordable DVD 172, or when download content recorded on the recordable DVD 172 is copied onto a target recordable DVD.

A content certificate which certificate type is "download content" is requested when download content stored in the data storage unit 701 is moved to a target recordable DVD, or when download content recorded on the recordable DVD 172 is moved to a target recordable DVD.

A content certificate is not requested, when content recorded on the DVD-ROM 171 is copied onto the data storage unit 701, or when download content recorded on the recordable DVD 172 is copied/moved onto the data storage unit 701.

Figure 12:
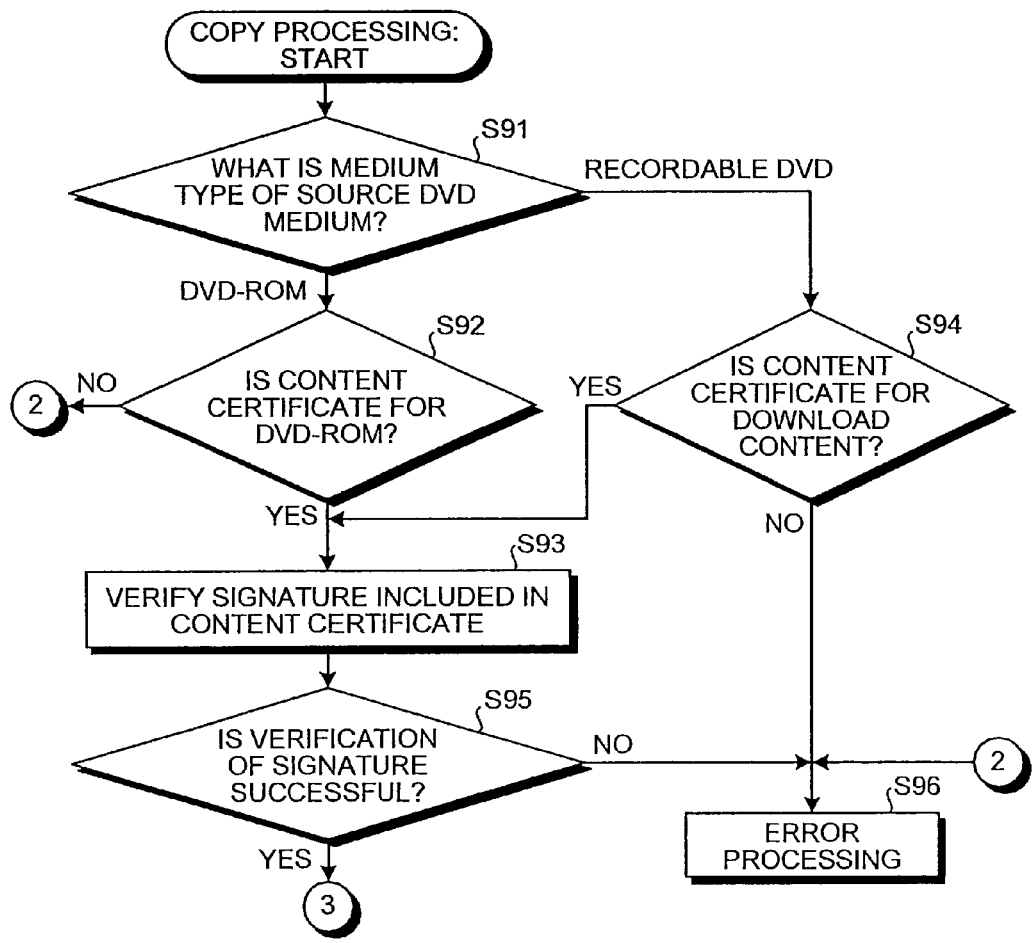
FIG. 12 is a flowchart of a copy processing according to the third embodiment.

A copy processing for copying content according to the third embodiment is described below. A user inputs either a copy instruction or a move instruction into the operating unit in the DVD recorder 700. For example, when download content recorded on the recordable DVD 172 is to be copied, a user inputs a copy instruction into the operating unit. Upon receiving the user's copy instruction, the DVD recorder 700 executes the copy processing shown in FIG. 12.

The DVD recorder 700 verifies whether a combination of a medium type and a certificate type is a proper combination. If the medium type is DVD-ROM, the content certificate is also to be for DVD-ROM, otherwise the DVD recorder 700 aborts the copy processing and proceeds an error processing. If the medium type is recordable DVD, the content certificate is to be for download content, otherwise the DVD recorder 700 aborts the copy processing and proceeds an error processing.

If the combination is a proper combination, the DVD recorder 700 verifies a signature included in the content certificate. If the verification of the signature is successful, the DVD recorder 700 requests the copy license server 200 to provide a content certificate depending on the copying target. For example, if content is to be copied onto the data storage unit 701, a content certificate is not required. Therefore, the DVD recorder 700 executes the copy processing after the copy license server 200 allows the DVD recorder 700 to copy the content. If content is to be copied onto a recordable DVD, the DVD recorder 700 requests the copy license server 200 to provide a content certificate for copied content. The copy processing is described in detail below with reference to FIGS. 12 and 13.

When the DVD recorder 700 receives a user's copy instruction, the recording-medium determining unit 162 determines a medium type of a source DVD medium (step S91). If the medium type is recordable DVD, the certificate verifying unit 163 verifies whether a content certificate is for download content, i.e., whether download content recorded on a recordable DVD is recorded as a certificate type (step S94). If download content recorded on a recordable DVD is not recorded as the certificate type (No at step S94), the certificate verifying unit 163 performs an error processing (step S96) to abort the copy processing.

If the certificate type is for download content, i.e., if download content recorded on a recordable DVD is recorded as the certificate type (Yes at step S94), the signature verifying unit 161 verifies a signature included in the content certificate by using the public key stored in the key storage unit 167 (step S93).

If the medium type is DVD-ROM at the step S91, the certificate verifying unit 163 verifies whether a content certificate is for DVD-ROM, i.e., whether DVD-ROM is recorded as a certificate type (step S92).

If DVD-ROM is not recorded as the certificate type (No at step S92), the certificate verifying unit 163 performs the error processing (step S96) to abort the copy processing.

If the content certificate is for DVD-ROM, i.e., if DVD-ROM is recorded as the certificate type (Yes at step S92), the signature verifying unit 161 verifies a signature included in the content certificate by using the public key stored in the key storage unit 167 (step S93).

If the verification of the signature is not successful (No at step S95), the signature verifying unit 161 performs the error processing (step S96) to abort the copy processing.

Figure 13:
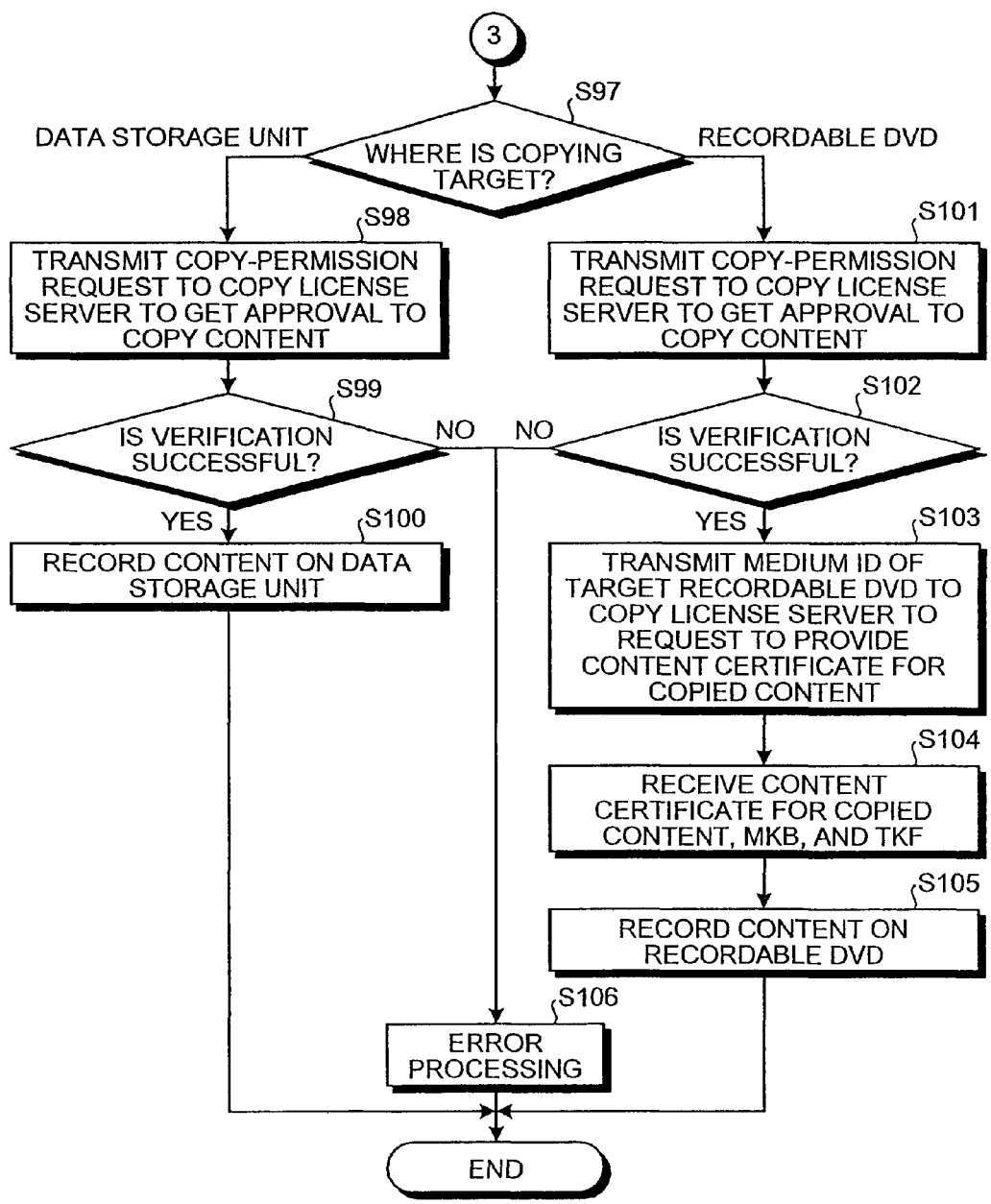
FIG. 13 is a continuation of the flowchart shown in FIG. 12.

If the verification of the signature is successful (Yes at step S95), the recording-medium determining unit 162 determines a copying target (step S97 in FIG. 13).

If the copying target is the data storage unit 701, the copy/move requesting unit 743 transmits a copy-permission request to the copy license server 200 (step S98).

The copy license server 200 verifies whether the DVD recorder 700 is a legitimate DVD recorder. If the verification of the DVD recorder 700 is not successful (No at step S99), the copy license server 200 instructs the DVD recorder 700 to perform an error processing (step S106) to abort the copy processing because the DVD recorder 700 is determined to be an illegally-altered DVD recorder.

If the verification of the DVD recorder 700 is successful (Yes at step S99), the recording unit 113 records the content on the data storage unit 701 (step S100). In the event, the content recorded on the DVD-ROM or the download content recorded on the recordable DVD is copied onto the data storage unit 701 completely.

When the copying target is the data storage unit 701, a content certificate is not required (see FIG. 11).

If the copying target is a recordable DVD at the step S97, the copy/move requesting unit 743 transmits a copy-permission request to the copy license server 200 (step S101). The copy/move requesting unit 743 can inform the copy license server 200 whether a source DVD medium is a recordable DVD or a DVD-ROM at this time.

The copy license server 200 verifies whether the DVD recorder 700 is a legitimate DVD recorder. If the verification of the DVD recorder 700 is not successful (No at step S102), the copy license server 200 instructs the DVD recorder 700 to perform the error processing (step S106) to abort the copy processing because the DVD recorder 700 is determined to be an illegally-altered DVD recorder.

If the verification of the DVD recorder 700 is successful (Yes at step S102), the copy/move requesting unit 743 transmits a copy-permission request together with a medium ID of a target recordable DVD to the copy license server 200 (step S103). In this case, the copying target is a recordable DVD, and a content type and a medium type of the source DVD medium are download content recorded on a DVD-ROM or a recordable DVD. Therefore, a content certificate which certificate type is copied content is to be requested (see FIG. 11).

To receive the content certificate for copied content, it is necessary to inform the copy license server 200 about a hash value to create a signature therein. If the fourth method of informing the copy license server 200 about the hash value according the first embodiment is employed, i.e., if the content certificate recorded on the source DVD medium is transmitted to the copy license server 200, the copy license server 200 can verify consistency between a certificate type of the content certificate and a medium type of the source DVD medium, and also can verify a signature included in the content certificate, so that the DVD recorder 700 can omit the procedures in the steps S92 and S93. In this case, the signature verifying unit 161 and the certificate verifying unit 163 can be removed from the host unit 720.

The copy license server 200 transmits a content certificate for copied content (i.e., a certificate type is copied content), a MKB, and a TKF to the certificate receiving unit 142 (step S104).

Then, the recording unit 113 copies the content onto the target recordable DVD (step S105). At the same time, the recording unit 113 records the content certificate for copied content, the MKB, and the TKF, which are transmitted from the copy license server 200, on the target recordable DVD. In the event, the content recorded on the DVD-ROM or the download content recorded on the recordable DVD 172 is copied onto the target recordable DVD completely.

A move processing for moving content according to the third embodiment is described below. For example, when content recorded on the recordable DVD 172 or the data storage unit 701 is to be moved, a user inputs a move instruction into the operating unit. Upon receiving the move instruction, the DVD recorder 700 executes a move processing.

Figure 14:
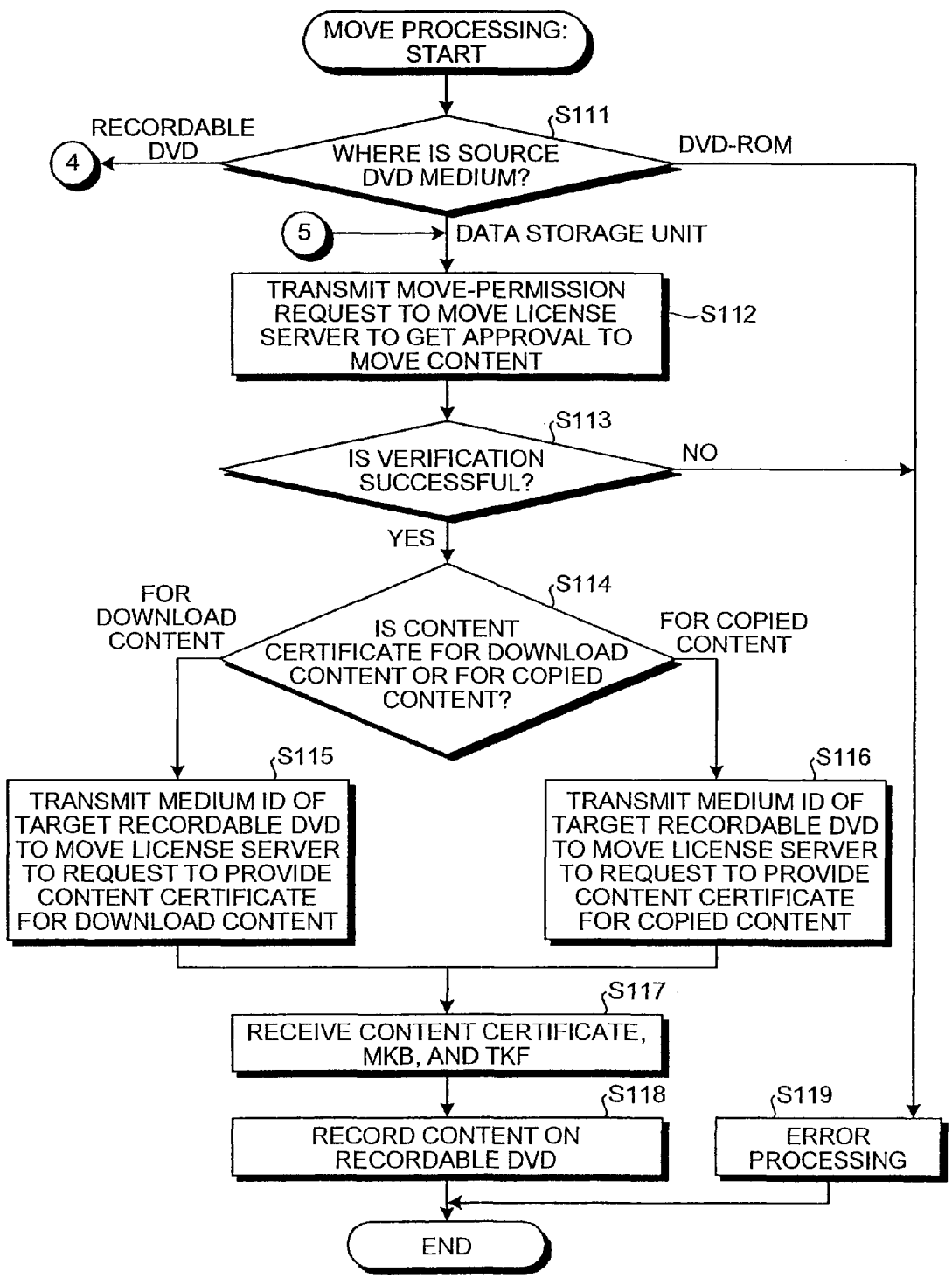
FIG. 14 is a flowchart of a move processing according to the third embodiment.

The DVD recorder 700 verifies whether a combination of a moving source of content and a content certificate is a proper combination. If the moving source is the data storage unit 701, a content certificate is not required. If the moving source is the recordable DVD 172, the DVD recorder 700 determines whether the content certificate is for download content or for copied content. If the combination is a proper combination, the DVD recorder 700 verifies a signature included in the content certificate. If the verification of the signature is successful, the DVD recorder 700 requests the move license server 400 to provide a content certificate depending on a moving target. The move processing for moving content is described in detail below with reference to FIGS. 14 and 15.

Upon receiving the move instruction, the recording-medium determining unit 162 determines a moving source (step S111). If the moving source is a DVD-ROM, the recording-medium determining unit 162 performs an error processing (step S119) to abort the move processing.

If the moving source is the data storage unit 701, the copy/move requesting unit 743 transmits a move-permission request to the move license server 400 (step S112).

The move license server 400 verifies whether the DVD recorder 700 is a legitimate DVD recorder. If the verification of the DVD recorder 700 is not successful (No at step S113), the move license server 400 instructs the DVD recorder 700 to perform the error processing (step S119) to abort the move processing.

If the verification of the DVD recorder 700 is successful (Yes at step S113), the certificate verifying unit 163 verifies whether a content certificate recorded on a target DVD medium is for download content (i.e., a certificate type is download content recorded on a recordable DVD) or for copied content (i.e., a certificate type is copied content recorded on a recordable DVD) (step S114).

If the content certificate is for download content (i.e., if the certificate type is download content recorded on a recordable DVD), the copy/move requesting unit 743 transmits a medium ID of the target recordable DVD to the move license server 400 to request a content certificate for download content (step S115).

If the content certificate is for copied content (i.e., if the certificate type is copied content recorded on a recordable DVD), the copy/move requesting unit 743 transmits a medium ID of the target recordable DVD to the move license server 400 to request a content certificate for copied content (step S116).

Upon receiving the medium ID, the move license server 400 transmits a content certificate, a MKB, and a TKF to the certificate receiving unit 142 (step S117). Then, the recording unit 113 records the content stored in the data storage unit 701 on the target recordable DVD (step S118). If the content stored in the data storage unit 701 is managed by the TKF as described in the second embodiment (the first method of the copy processing), the TKF stored in the data storage unit 701 is to be deleted. If the content stored in the data storage unit 701 is bound to the DVD recorder 700 without using the TKF (the second method of the copy processing), the content stored in the data storage unit 701 is to be deleted. The recording unit 113 records the content certificate, the MKB, and the TKF, which are transmitted from the move license server 400, on the target recordable DVD. In the event, the content stored in the data storage unit 701 is moved to the target recordable DVD completely.

Figure 15:
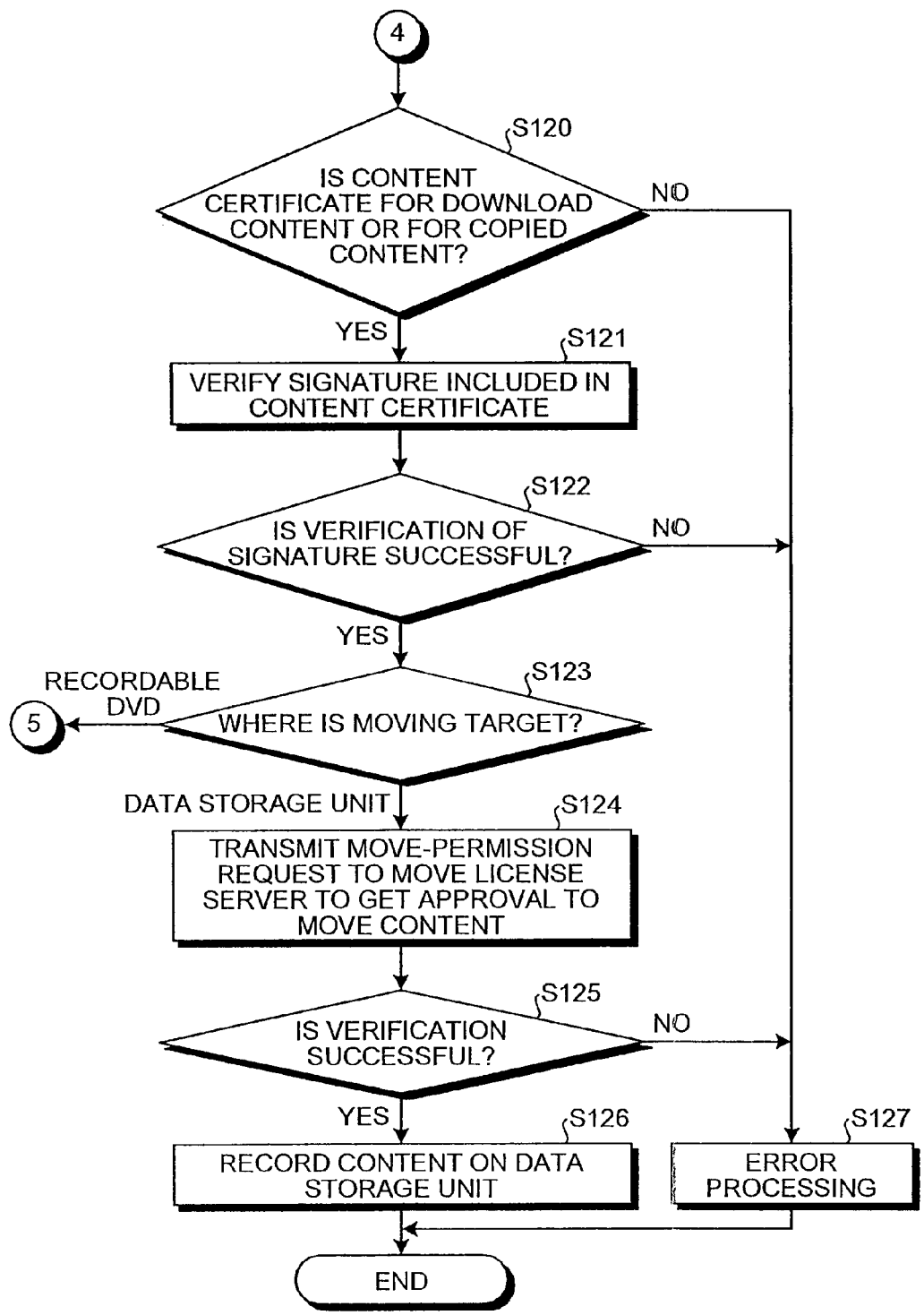
FIG. 15 is a continuation of the flowchart shown in FIG. 13.

At the step S111, if the moving source is the recordable DVD 172, the certificate verifying unit 163 verifies whether the content certificate recorded on the recordable DVD 172 is for download content (i.e., a certificate type is download content recorded on a recordable DVD) or for copied content (i.e., a certificate type is copied content recorded on a recordable DVD) (step S120 in FIG. 15).

If the content certificate is neither for download content nor for copied content (No at step S120), the certificate verifying unit 163 performs an error processing (step S127) to abort the move processing.

If the content certificate is either for download content or for copied content (Yes at step S120), the signature verifying unit 161 verifies a signature included in the content certificate by using the public key stored in the key storage unit 167 (step S121). If the verification of the signature is not successful (No at step S122), the signature verifying unit 161 performs the error processing (step S127) to abort the move processing.

If the verification of the signature is successful (Yes at step S122), the recording-medium determining unit 162 determines a moving target (step S123).

If the moving target is a recordable DVD, to return back to the procedure at the step S112, the move processing is performed again. If the moving target is the data storage unit 701, the copy/move requesting unit 743 transmits a move-permission request to the move license server 400 (step S124).

The move license server 400 verifies whether the DVD recorder 700 is a legitimate DVD recorder. If the verification of the DVD recorder 700 is not successful (No at step S125), the move license server 400 instructs the DVD recorder 700 to perform the error processing (step S127) to abort the move processing because the DVD recorder 700 is determined to be an illegally-altered DVD recorder.

If the verification of the DVD recorder 700 is successful (Yes at step S125), the recording unit 113 records the content on the data storage unit 701 (step S126). At the same time, the TFK recorded on the recordable DVD 172 is to be deleted. In the event, the download content or the copied content, which is recorded on the recordable DVD 172, is moved to the data storage unit 701 completely.

Figure 4:
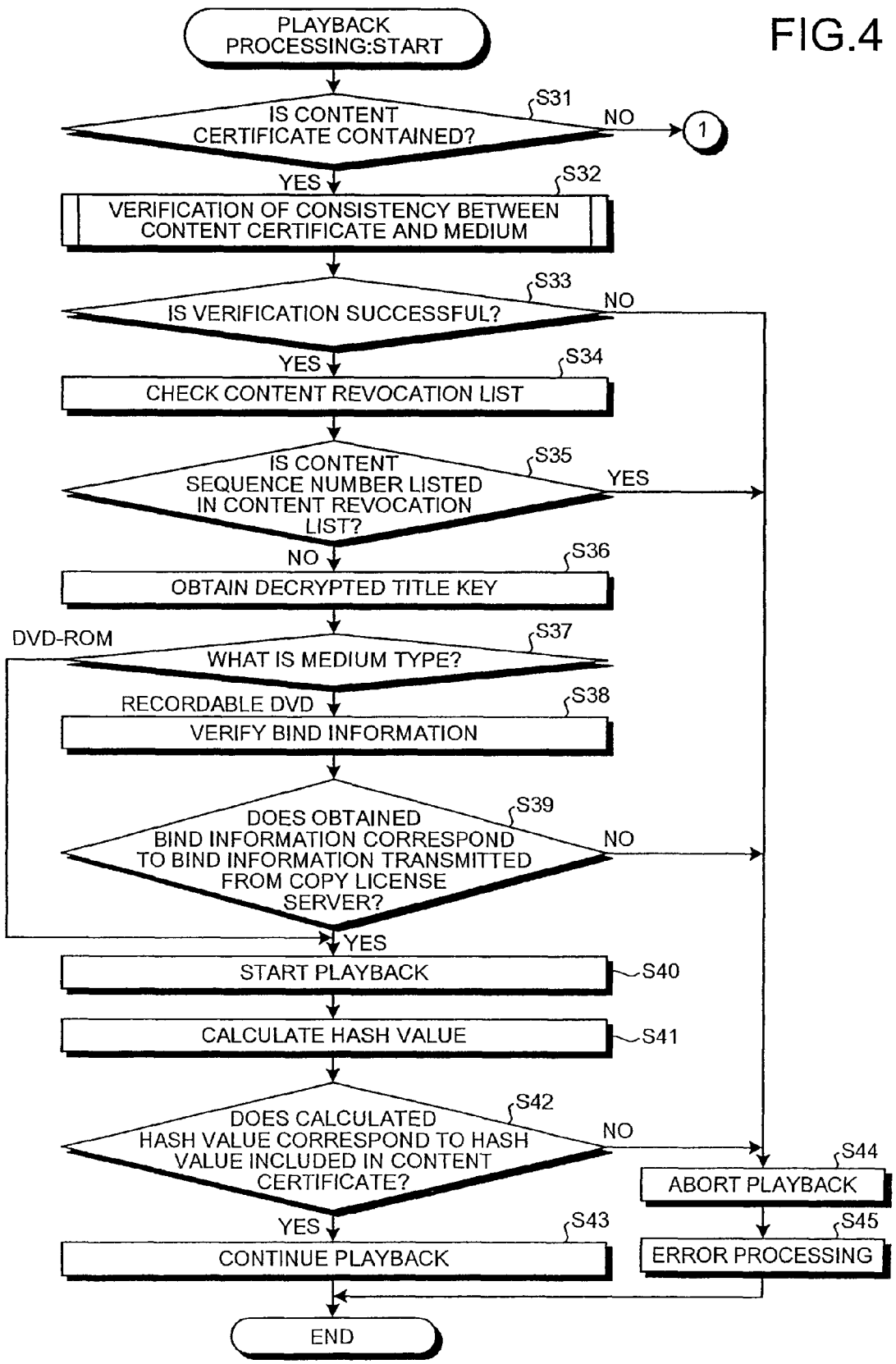
FIG. 4 is a flowchart of a playback processing according to the first embodiment.

The playback processing for playing back the download content or the copied content, which is copied or moved onto the target recordable DVD, are identical to that of the first embodiment except for the procedure at the step S32 for verifying the consistency between the content certificate and the DVD medium (see FIGS. 4 and 5).

Figure 16:
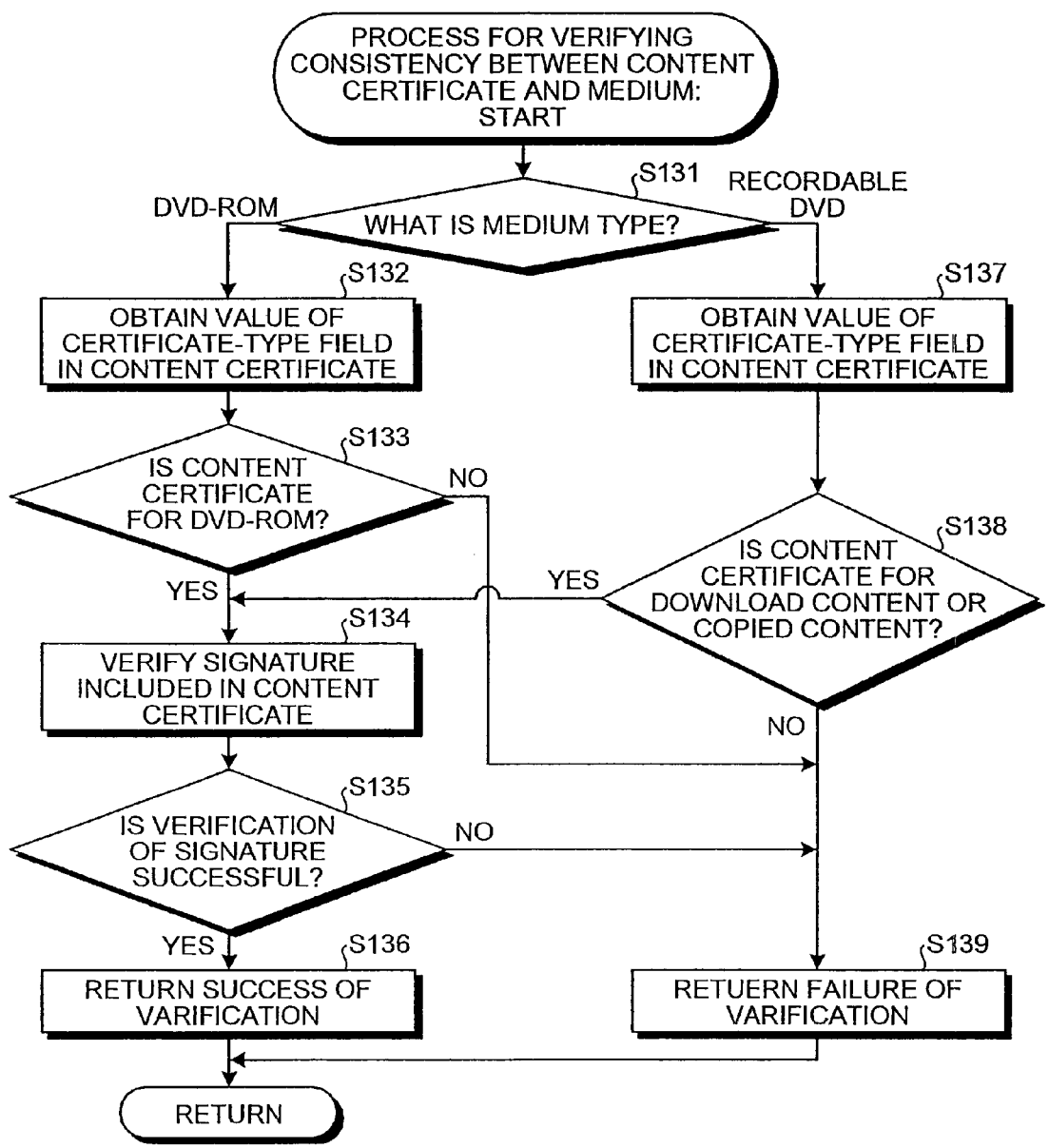
FIG. 16 is a flowchart of a process for verifying consistency between a content certificate and a DVD medium according to the third embodiment.

In the third embodiment, when a content certificate recorded on a recordable DVD is verified, it is determined whether the content certificate is for copied content or for download content. A process for verifying consistency between a content certificate and a DVD medium according to the third embodiment is described below with reference to FIG. 16.

First, the certificate verifying unit 163 verifies a medium type of a DVD medium (step S131). If the medium type is DVD-ROM, the certificate verifying unit 163 obtains a value of a certificate-type field included in a content certificate to verify (step S132) whether the content certificate is for DVD-ROM (step S133). If the content certificate is not for DVD-ROM (No at step S133), the certificate verifying unit 163 determines that a combination of the content certificate and the medium type is not a proper combination, and returns a return value of verification failure (step S139). If the content certificate is for DVD-ROM (Yes at step S133), the signature verifying unit 161 verifies a signature included in the content certificate (step S134). If the verification of the signature is successful (Yes at step S135), the signature verifying unit 161 returns a return value of verification success (step S136). If the verification of the signature is not successful (No at step S135), the signature verifying unit 161 returns a return value of verification failure (step S139).

At the step S131, if the medium type is recordable DVD, the certificate verifying unit 163 obtains a value of a certificate-type field included in a content certificate to verify (step S137) whether the content certificate is for copied content or for download content (step S138). If the content certificate is neither for copied content nor for download content (No at step S138), the certificate verifying unit 163 determines that a combination of the content certificate and the medium type is not a proper combination, and returns a return value of verification failure (step S139). If the content certificate is either for copied content or for download content (Yes at step S138), to proceed to the procedure at the step S134, the signature verifying unit 161 verifies a signature included in the content certificate (step S134), and performs the procedures in the steps S135 and S136.

In the DVD recorder 700 according to the third embodiment, there are three certificate types of content certificates. The content certificates are for DVD-ROM, for copied content, and for download content. The DVD recorder 700 determines whether a combination of a medium type of a copying/moving source and a certificate type in a content certificate is a proper combination. If the combination is a proper combination, the DVD recorder 700 requests the copy license server 200 or the move license server 400 to provide a content certificate that corresponds to a content type on a recording source, a recording target, and a type of action (either copy or move). Upon receiving the content certificate, the DVD recorder 700 records the content together with the content certificate on the target DVD medium. As described above, the DVD recorder 700 according to the third embodiment can handle download content the same as a package DVD-ROM. Therefore, the DVD recorder 700 can certainly protect both the package DVD-ROM and the download content from an illegal copy or an illegal move. Thus, the DVD recorder 700 can protect a copyright of content. Moreover, a manufacturer of content can reduce physical distribution costs of DVD media.

In the DVD recorder according to the first to third embodiments, as shown in FIGS. 1 and 7, the copy processing and the move processing are performed by the copy managing unit 140 or 740, and playback of content is performed by the playback processing unit 150. The DVD recorder is not limited to those units to perform the copy, move, and playback of content. For example, a playback-only apparatus such as a DVD player can be used to play back content. In this case, the DVD player needs to include the drive unit 110 and the host unit 120 or 720. The host unit 120 or 720 in the DVD player can include the playback processing unit 150, the signature verifying unit 161, and the key storage unit 167.

In the DVD recorder according to the first to third embodiments, a DVD medium is used as a recording medium. The DVD recorder according to the first to third embodiments is not limited to the DVD medium, and can be applicable to all types of recording media.

In the second and third embodiments, the copy license server 200 and the move license server 400 are explained as separate units. However, the functions of the copy license server 200 and the move license server 400 can be combined into a single server.

Computer programs for copy, move, and playback of content executed by the DVD recorder according to the first to third embodiments are built into a memory such as a ROM in advance.

The computer programs can be recorded on a compact disk (CD) ROM (a CD-ROM), a flexible disk (FD), a CD recordable (a CD-R), or a DVD, which are computer-readable recording media, in a user-installable or executable format.

The computer programs can be stored in a computer that is attached to a network such as the Internet to download the programs via the network. Furthermore, the programs can be distributed via the network.

The computer programs have a modular composition that includes the readout unit 112, the recording unit 113, the copy managing unit 140, the playback processing unit 150, the signature verifying unit 161, the recording-medium determining unit 162, the certificate verifying unit 163, the communication processing unit 164, and the like. The programs are read out by a central processing unit (CPU) as actual hardware. Then, those units as described above are loaded into a main storage unit to create therein.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An apparatus to play back content that is recorded on a recording medium and that is encrypted by a first cryptographic key, the first cryptographic key being encrypted by using a second cryptographic key and being recorded on the recording medium, the apparatus comprising:
   a key storing unit that stores the second cryptographic key and a public key;
   a key decryption unit that decrypts encrypted first cryptographic key by using the second cryptographic key;
   a playback unit that decrypts encrypted content by using the first cryptographic key and plays back decrypted content;
   a certificate verifying unit that verifies whether a content certificate exists in the recording medium, the content certificate including
      a certificate type registering a content type indicative of a record type of the content on the recording medium,
      a hash value based on information of a portion of the content, and
      a signature created for the certificate type and the hash value by using a private key that corresponds to the public key, wherein when the content certificate exists in the recording medium, the certificate verifying unit determines whether a combination of the certificate type of the content certificate recorded on the recording medium and a medium type of the recording medium is a proper combination;
   a hash-value verifying unit that verifies, when the combination of the certificate type and the medium type of the recording medium is the proper combination, whether the hash value included in the content certificate matches a hash value calculated from the content; and
   a digital-watermark verifying unit that verifies, when the content certificate does not exist in the recording medium, whether, at the time of playback of the content, a digital watermark is embedded in the content, wherein
   the playback unit continues to play back the content when the hash value included in the content certificate matches the hash value calculated from the content and the playback unit aborts playback of the content when the combination of the certificate type and the medium type of the recording medium is not the proper combination, when the hash value included in the content certificate does not match the hash value calculated from the content, or when the digital watermark is embedded in the content.

2. The apparatus according to claim 1, further comprising a signature verifying unit that verifies, when the combination of the certificate type and the medium type of the recording medium is the proper combination, the signature by using the public key stored in the key storing unit, wherein
   when verification of the signature is successful, the playback unit starts playing back the content.

3. The apparatus according to claim 1, wherein
the content certificate further comprises a content sequence number for identifying the content and a content revocation list registering the content sequence number of illegally-created content;
the certificate verifying unit further verifies, when the combination of the certificate type and the medium type of the recording medium is the proper combination, whether the content sequence number of the content certificate exists in the content revocation list of the content certificate; and
the playback unit starts playing back the content when the content sequence number of the content certificate does not exist in the content revocation list of the content certificate and the playback unit aborts playback of the content when the content sequence number of the content certificate exists in the content revocation list of the content certificate.

4. The apparatus according to claim 1, further comprising a bind determining unit that determines, when the combination of the certificate type and the medium type of the recording medium is the proper combination, whether there is a match between bind information calculated on the basis of a medium ID unique to the recording medium and either the content certificate or the first cryptographic key and bind information received from a copy license server connected to a network, wherein
the playback unit starts playing back the content when calculated bind information and received bind information match, and the playback unit aborts playback of the content when the calculated bind information and the received bind information do not match.

5. A method to play back content that is recorded on a recording medium and that is encrypted by a first cryptographic key, the first cryptographic key being encrypted by using a second cryptographic key in a key storing unit and being recorded on the recording medium, the method comprising:
   decrypting encrypted first cryptographic key by using the second cryptographic key;
   decrypting encrypted content by using the first cryptographic key;
   playing back decrypted content;
   verifying whether a content certificate exists in the recording medium, the content certificate including a certificate type registering a content type indicative of a record type of the content on the recording medium, a hash value based on information of a portion of the content, and a signature created for the certificate type and the hash value by using a private key that corresponds to a public key in the key storing unit;
   determining, when the content certificate exists in the recording medium, whether a combination of the certificate type of the content certificate recorded on the recording medium and a medium type of the recording medium is a proper combination;
   verifying, when the combination of the certificate type and the medium type of the recording medium is the proper combination, whether the hash value included in the content certificate matches a hash value calculated from the content; and
   verifying, when the content certificate does not exist in the recording medium, whether, at the time of playback of the content, a digital watermark is embedded in the content, wherein
   the playing back includes continuing to play back the content when the hash value included in the content certificate matches the hash value calculated from the content and aborting playback of the content when the combination of the certificate type and the medium type of the recording medium is not the proper combination, when the hash value included in the content certificate does not match the hash value calculated from the content, or when the digital watermark is embedded in the content.

6. A non-transitory computer-readable recording medium encoded with instructions, which when executed by a computer, causes the computer to execute a method to play back content that is recorded on a recording medium and that is encrypted by a first cryptographic key, the first cryptographic key being encrypted by using a second cryptographic key in a key storing unit and being recorded on the recording medium, the method comprising:
   decrypting encrypted first cryptographic key by using the second cryptographic key;
   decrypting encrypted content by using the first cryptographic key;
   playing back decrypted content;
   verifying whether a content certificate exists in the recording medium, the content certificate including a certificate type registering a content type indicative of a record type of the content on the recording medium, a hash value based on information of a portion of the content, and a signature created for the certificate type and the hash value by using a private key that corresponds to a public key in the key storing unit;
   determining, when the content certificate exists in the recording medium, whether a combination of the certificate type of the content certificate recorded on the recording medium and a medium type of the recording medium is a proper combination;
   verifying, when the combination of the certificate type and the medium type of the recording medium is the proper combination, whether the hash value included in the content certificate matches a hash value calculated from the content; and
   verifying, when the content certificate does not exist in the recording medium, whether, at the time of playback of the content, a digital watermark is embedded in the content, wherein
   the playing back includes continuing to play back the content when the hash value included in the content certificate matches the hash value calculated from the content and aborting playback of the content when the combination of the certificate type and the medium type of the recording medium is not the proper combination, when the hash value included in the content certificate does not match the hash value calculated from the content, or when the digital watermark is embedded in the content.

* * * * *